(12) United States Patent
Couture

(10) Patent No.: US 9,941,680 B2
(45) Date of Patent: Apr. 10, 2018

(54) SWITCHING APPARATUS, CONTROL SYSTEM AND METHOD FOR VARYING AN IMPEDANCE OF A PHASE LINE

(75) Inventor: Pierre Couture, Boucherville (CA)

(73) Assignee: HYDRO-QUEBEC, Montreal, Quebec (CA)

(*) Notice: Subject to any disclaimer, the term of this patent is extended or adjusted under 35 U.S.C. 154(b) by 1074 days.

(21) Appl. No.: 14/127,445

(22) PCT Filed: Jul. 22, 2011

(86) PCT No.: PCT/CA2011/000850
§ 371 (c)(1),
(2), (4) Date: Dec. 18, 2013

(87) PCT Pub. No.: WO2013/013282
PCT Pub. Date: Jan. 31, 2013

(65) Prior Publication Data
US 2014/0125137 A1 May 8, 2014

(51) Int. Cl.
*G05F 1/10* (2006.01)
*H01H 51/34* (2006.01)
(Continued)

(52) U.S. Cl.
CPC .............. *H02G 7/20* (2013.01); *H02G 7/16* (2013.01); *H02J 13/0065* (2013.01); *H02J 13/0075* (2013.01); *H02J 3/00* (2013.01)

(58) Field of Classification Search
CPC ...... H02J 13/0065; H02J 13/0062; H02J 3/00; H02J 13/00; H02G 7/16; H02G 7/20;
(Continued)

(56) References Cited

U.S. PATENT DOCUMENTS 5,720,028 A * 2/1998 Matsumoto ........... G06F 3/0601
714/5.11
5,886,801 A * 3/1999 Van Deventer ........ H04B 10/27
385/16
(Continued)

FOREIGN PATENT DOCUMENTS

CA    2 441 241 A1    12/2003
CN    101919136 A     12/2010
(Continued)

OTHER PUBLICATIONS

International Search Report for corresponding International Patent Application No. PCT/CA2011/000850 dated Apr. 17, 2012.
(Continued)

*Primary Examiner* — Jared Fureman
*Assistant Examiner* — Rasem Mourad
(74) *Attorney, Agent, or Firm* — Merchant & Gould P.C.

(57) ABSTRACT

An apparatus and a method are for varying an impedance of a phase line of a segment of a first electrical power line, the phase line including n conductors electrically insulated from each other and short-circuited together at two ends of the segment. The apparatus includes at least one controllable switching device for connection with at least one of the conductors. The apparatus also includes a controller for performing control of the at least one controllable switching device, the controller having at least one optical port for receiving first optical signals on which the control is based, and for sending second optical signals to adjacent switching apparatuses, the second optical signals including status information of the one switching apparatus, upon which control of adjacent switching apparatuses is based.

23 Claims, 20 Drawing Sheets

(51) Int. Cl.
*H02G 7/20* (2006.01)
*H02J 13/00* (2006.01)
*H02G 7/16* (2006.01)
*H02J 3/00* (2006.01)

(58) Field of Classification Search
CPC ........ H02G 7/00; H02G 1/02; Y10T 307/747; G01R 31/085
See application file for complete search history.

(56) References Cited

U.S. PATENT DOCUMENTS

| | | | |
|---|---|---|---|
| 6,018,152 | A | 1/2000 | Allaire et al. |
| 6,396,172 | B1 | 5/2002 | Couture |
| 6,486,569 | B2 | 11/2002 | Couture |
| 7,157,812 | B2 * | 1/2007 | Couture .................... H02J 3/06 307/112 |
| 7,235,900 | B1 * | 6/2007 | Couture .................... H02G 7/20 219/482 |
| 7,639,460 | B2 * | 12/2009 | Couture ................. H01H 3/001 361/2 |
| 8,502,542 | B2 | 8/2013 | Couture |
| 9,225,170 | B2 * | 12/2015 | Hyde ....................... H02J 3/16 |
| 2002/0005668 | A1 * | 1/2002 | Couture .................... H02G 7/00 307/98 |
| 2003/0006652 | A1 * | 1/2003 | Couture .................... H02G 7/00 307/125 |
| 2009/0250449 | A1 * | 10/2009 | Petrenko ................. H02G 7/16 219/262 |
| 2010/0176814 | A1 * | 7/2010 | Couture ............... G01R 31/085 324/521 |
| 2013/0092678 | A1 * | 4/2013 | Petrenko ................. H02G 1/02 219/473 |

FOREIGN PATENT DOCUMENTS

| | | |
|---|---|---|
| JP | 59-217172 A | 12/1984 |
| JP | 2-074135 A | 3/1990 |
| JP | 2598101 B2 * | 4/1997 |
| JP | 2008-295298 A | 12/2008 |
| JP | 2009-187090 A | 8/2009 |
| JP | 2009187090 A * | 8/2009 |
| WO | WO 2008/154749 A1 | 12/2008 |

OTHER PUBLICATIONS

Couture, P. et al. "Power Flow and Stability Control Using an Integrated HV Bundle-Controlled Line-Impedance Modulator", IEEE Transactions on Power Delivery, vol. 25, No. 4, Oct. 2010, pp. 2940-2949.

Couture, P. "Smart Power Line and photonic de-icer concepts for transmission-line capacity and reliability improvement", Cold Regions Science and Technology, vol. 65, No. 1, 2010, pp. 13-22.

Zhijin, Z. et al. "The Method and Test of De-icing on Four Bundled-conductors by Leading Running Current into Various Sub-conductor Combinations", The 14$^{th}$ International Workshop on Atmospheric Icing of Structures, Chongqing, China, May 8-May 13, 2011, pp. 1-6.

Guanghui, C. et al. "Novel Deicing Approach of Overhead Bundled Conductors of EHV Transmission Systems", IEEE Transactions on Power Delievery, vol. 24, No. 3, Jul. 2009, pp. 1745-1747.

Divan, D. et al. "Distributed FACT-A New Concept for Realizing Grid Power Flow Control", IEEE Transactions on Power Electronics, vol. 22, No. 6, Nov. 2007, pp. 2253-2260.

Couture, P. "Switching Modules for the Extraction/Injection of Power (Without Ground or Phase Reference) From a Bundled HV Line", IEEE Transactions on Power Delivery, vol. 19, No. 3, Jul. 2004, pp. 1259-1266.

Amin, M. et al. "Toward a Smart Grid", IEEE Power and Energy Magazine, 2005, pp. 34-41.

* cited by examiner

SWITCHING APPARATUS, CONTROL SYSTEM AND METHOD FOR VARYING AN IMPEDANCE OF A PHASE LINE

This application is a National Stage Application of PCT/CA2011/000850, filed 22 Jul. 2011, and which application is incorporated herein by reference. To the extent appropriate, a claim of priority is made to each of the above disclosed applications.

FIELD OF THE INVENTION

The present invention relates to an apparatus, a control system and a method for varying the impedance of a phase line of a segment of an electrical power line. The phase line comprises n conductors electrically insulated one from another and short-circuited between themselves at two ends of the segment.

DESCRIPTION OF PRIOR ART

Known in the art, there exists U.S. Pat. No. 6,396,172, granted on May 28, 2002. This patent describes a switching apparatus made to be used with a section of an electrical energy transmission line having several phase lines. Each of the phase lines has several conductors electrically insulated one from another and connected in parallel. The conductors of each phase line are short-circuited between themselves at two extremities of the section. The apparatus comprises pairs of interrupters connected in parallel, to open and close selectively the conductors of each phase line, detection means for detecting current operational conditions of the section and controlling means for controlling pairs of interrupters according to the current operational conditions of the section.

U.S. Pat. No. 6,486,569 B2, granted on Nov. 26, 2002, describes a method of managing a power flow in an electric power network. The method comprises the steps of providing switching units that are mounted on insulated portions of pylons of electric power lines for switching the current of at least one conductor of a plurality of phase conductors that are electrically insulated from one another, said switching of conductors enabling a change of impedance which modulates the power flow. The method also comprises a step of managing the power flow in the segments of the electric power line, by changing the series impedance of the line by controlling switching units.

Patent application CA 2,441,241 describes a method for increasing the transit capacity of high voltage power lines, particularly useful in region subject to ice storms.

Document entitled "Switching Modules for the Extraction/Injection of Power (Without Ground or Phase Reference) from a Bundled HV Line"[1] by Pierre Couture, inventor of the present invention, describes devices for flexible AC transmission systems (FACTS) for high-voltage power lines with bundled conductors. The FACTS devices are based on switching modules mounted on insulated portions of the transmission towers in close proximity to the line conductors. The switching modules include electromechanical and power-electronic switches, and can be coupled to other passive components. The switching modules allow connecting and disconnecting one or more sub-conductors of a phase bundle of the power line at numerous line segments in the network. Power flow is managed in a line segment by changing the series impedance of the line segment with the switching module. Power flow management is achieved by using serial switching modules distributed throughout the transmission lines of the network. This document describes switching modules which communicate with one another between the different line segments through a power line carrier, or between phases at each tower through a short-range radio-frequency (RF) or infrared link.

[1] IEEE Transactions on Power Delivery, Vol. 19, No. 3, July 2004

U.S. Pat. No. 7,235,900 B1 (COUTURE), granted on Jun. 26, 2007, describes a switching apparatus and a method for varying the impedance of a phase line of a segment of an electrical power line, the phase line including n conductors. The apparatus includes, for each the conductors, a passive component and a pair of electromechanical and electronic switches, the pair of switches being able to connect and disconnect in a selective manner the passive component in series with the corresponding conductor, the switches of each pair being controllable independently. The apparatus also includes a detecting device for detecting the current operating conditions of the phase line, and a control device for controlling each pair of switches according to the current operating conditions.

PCT/CA2008/001185 (COUTURE), published as WO/2008/154749, describes an apparatus and a method for monitoring a phase line of a part of an electrical energy transmission line. The apparatus comprises a monitoring device of a parameter of a phase line. The parameter is representative of current operational conditions of the phase line and has a known propagation speed. The apparatus also comprises a device for generating a detection signal of an event each time a parameter has a value exceeding a threshold, and for storing a reception time when the detection signal is generated. The apparatus also has a device for transmitting a signal representative of a geographic location of the extremity of the section and a device for geographically locating the event once two consecutive detection signals are generated from the signal representative of the geographic location, and on the reception times associated with two detection signals.

U.S. Pat. No. 7,639,460 (COUTURE) describes a switching apparatus which includes a vacuum interrupter connected in series with one of the conductors on a phase line of a power line. A controllable motor allows selectively opening and closing the vacuum interrupter. A detector allows detecting a parameter representative of current operating conditions of the phase line; and a controller allows controlling the controllable motor according to the parameter detected by the detector.

Document entitled "Power Flow and Stability Control Using an Integrated HV Bundle-Controlled Line-Impedance Modulator"[2] by Pierre Couture, inventor of the present invention, describes a bundle-controlled line-impedance modulator for the management of power flow under steady-state and dynamic conditions.

[2] P. Couture, J. Brochu, G. Sybille, P. Giroux, A. O. Barry, "Power Flow and Stability Control Using an Integrated HV Bundle-Controlled Line-Impedance Modulator", IEEE Trans. on Power Delivery, vol. 25, no. 4, pp., October 2010.

Document entitled "Smart Power Line and Photonic de-icer concepts for transmission-line capacity and reliability improvement"[3] introduces the Smart Power Line (SPL) concept and explains how SPL can address three important needs: line de-icing, line impedance modulation and line monitoring.

[3] Couture P., "Smart Power Line and Photonic de-icer concepts for transmission-line capacity and reliability improvement", Cold Regions Science and Technology, Volume 65, Issue 1, January 2011

U.S. Pat. No. 6,018,152 (ALLAIRE) and US 2009/0250449 (PETRENKO) describes yet other methods and a devices for de-icing conductors of power lines.

Document entitled "The Method and Test of De-icing on Four Bundled-conductors by Leading Running Current into Various Sub-Conductors Combinations"[4] by Zhang Zhijin, explains how de-icing of bundled conductors was verified and tested by leading running current into various sub-conductors combination.

[4] Zhang Zhijin, Bi Moaqiang, Jiang Xingliang, Huang Haizhou, Hu Jianlin, Sun Ciaxin, "The Method and Test of De-icing on Four Bundled-conductors by Leading Running Current into Various Sub-Conductors Combinations", 14th International Workshop of Atmostpheric Icing Structures, Chongqing, China, May 8-13, 2011

Document entitled "Novel Deicing Approach of Overhead Bundled Conductors of EHV Transmission Systems"[5], by Chang Guanghui, describes a method for de-icing power lines by reconfiguring bundled conductors from parallel connection to series connection, in order to increase current flow through conductors.

[5] Chang Guanghui, Su Sheng, Li Mingming and Chao Daifeng, "Novel Deicing Approach of Overhead Bundled Conductors of EHV Transmission Systems", IEEE Transactions on Power Delivery, vol. 24, no. 3, pp., July 2009

Document entitled "Distributed FACTS—A New Concept for Realizing Grid Power Flow Control"[6] by Deepak Divan introduces the concept of distributed Flexible AC Transmission Systems (FACTS) devices to realize power flow control. Distributed series impedance and distributed static series compensator are clipped on an existing power line to change the impedance of the line so as to control the power flow.

[6] Deepak Divan, Harjeet Johal, "Distributed FACTS—A New Concept for Realizing Grid Power Flow Control", IEEE, 2005.

A Smart Power Line (SPL) is a conventional bundled power line provided with switching apparatuses and line monitoring systems, allowing performing line monitoring, de-icing and power flow control of the line. For example, an SPL can be a 735 kV power line, formed by several 30 km-segments of insulated phase line sub-conductors, and on which back-to-back switching modules are hooked, generally at every 60 km on dead-end towers, which are also known as anchor towers. An anchor tower provided with smart switching apparatuses and onboard protection systems at each phase is generally referred to as a mini substation. A mini substation can also include several anchor towers provided with smart switching apparatuses, the towers being located within an immediate environment from one another.

A 735 kV SPL is typically provided with mini-substations each 60 km and with substations each located at every 300 km or so, along the line. A substation includes different types of devices, such as circuit breakers, disconnect switches, transformers, measurement instruments and the likes.

An SPL also generally include at least one ground wire, such as an optical ground wire for example. An optical ground wire has the double function of 1) protecting the electrical power line against lightning strikes via metallic wires surrounding the optical fibres, and 2) of allowing the transmission of data, via the fibres. The information transmitted can include protection and control data of the power line or of the grid, or voice data. The fibre optics located in the ground wire are eventually connected to substations of the line, and ultimately to a remote control room of the transmission network. A low band communication link, of the Power Line Carrier P.L.C sort, can be used to allow limited communication redundancy.

Referring to FIGS. 1 and 2, a mini substation 10 is shown. In the case illustrated, the mini substation 10 includes one anchor tower 12 provided smart switching apparatuses 14 and onboard protection systems 16 located on each phase. Each phase line A, B, C, is provided with a pair of switching apparatuses 14, mounted back-to-back. The pairs of switching apparatuses 14 are located on the same tower 12, each apparatus 14 being at a different potential, this potential being the one of the phase line A, B or C to which the apparatus is hooked.

The switching apparatuses 14 communicate with each other via Radio-Frequency (RF) communication devices, located within the switching modules. These wireless devices allow the apparatuses 14 to communicate with one another, even though they operate at different voltages. A connection of the modules with galvanic wire is not possible, precisely because the modules are each at a different voltage.).

An RF-to-optics and optics-to-RF converter located near the ground wires 18 is used to convert RF signals of the modules to optical signals, in order to allow transmission of data between the switching apparatuses 14 and the optical fibres of the ground wires 18. The RF devices together with the RF-to-optics converter form a communication system. This communication system can also be used to allow communication between the apparatuses 14 and other switching apparatuses of a second or a third transmission-line located in the same corridor, in an immediate environment of the anchor tower 12, or with apparatuses of towers pertaining to the same mini substation. In addition, RF transceivers of the switching apparatuses can also be used to communicate with sensors located along the associated segment line.

The methods and devices described in the above references and the system shown in FIGS. 1 and 2 allow varying the impedance of conductors of power line, with the aim of monitoring the line, controlling the power flow within the line or of de-icing the conductors.

It is believed that there is a need for switching apparatuses, control systems and methods for varying and impedance of a phase line that are more reliable than apparatuses, systems and methods of the prior art.

SUMMARY OF THE INVENTION

An object of the present invention is to provide an apparatus and a method addressing the above-mentioned needs.

The present invention provides a switching apparatus for varying an impedance of a phase line of a segment of a first electrical power line. The phase line includes n conductors electrically insulated from each other and short-circuited together at two ends of the segment. The apparatus comprises:
  at least one controllable switching device for connection with at least one of the conductors; and
  a controller for performing a control of the at least one controllable switching device, the controller having at least one optical port for receiving first optical signals on which said control is based, and for sending second optical signals to adjacent switching apparatuses, said second optical signals including status information of said one switching apparatus, upon which a control of adjacent switching apparatuses is based.

The invention also concerns a system for varying impedance an electrical power line, the electrical power line having several segments connected in series, each segment having at least one phase line, each phase line including n conductors electrically insulated from each other and short-circuited together at two ends of the segment. The system comprises several switching apparatuses, each apparatus being associated with one of the segments. Each apparatus comprises:

a controllable switching device for connection with at least one of the conductors of the one segment;

a controller for performing a control of the at least one controllable switching device, the controller having at least one optical port:

for receiving first optical signals from adjacent switching apparatuses connected to the segments which are adjacent to the one segment; and for sending second optical segments to the adjacent switching apparatuses.

The controller is for calculating values based on said first optical signals received. The second optical signals include said values, upon which a control of the controllable switching devices of adjacent switching apparatuses is based.

The present invention also provides a method for varying an impedance of a phase line of a segment of a first electrical power line, the phase line including n conductors electrically insulated from each other and short-circuited together at two ends of the segment, the method comprising the steps of:

a) receiving first optical signals on a switching apparatus associated with the segment, the switching apparatus including a controllable switching device connected with at least one of the conductors;

b) performing a control of the switching device based on said first optical signals; and c) sending second optical signals from the switching apparatus to adjacent switching apparatuses, said second optical signals including status information of said one switching apparatus, upon which a control of adjacent switching apparatuses is based.

There is also provided a method for varying impedance an electrical power line, the electrical power line having several segments connected in series, each segment having at least one phase line, each phase line including n conductors electrically insulated from each other and short-circuited together at two ends of the segment, the method comprising the steps of:

a) receiving first optical signals on switching apparatuses associated with the segments, each switching apparatus including a controllable switching device connected with at least one of the conductors;

b) calculating values based on said first optical signals on one of said switching apparatus; and c) sending second optical signals from said one switching apparatus to adjacent switching apparatuses, said second optical signals including said values, upon which a control of adjacent switching apparatuses is based.

The invention will be better understood from a reading of the non-restrictive description that follows of a preferred embodiment thereof, and upon referring to the appended drawings.

DETAILED DESCRIPTION OF DRAWINGS

Figure 1:
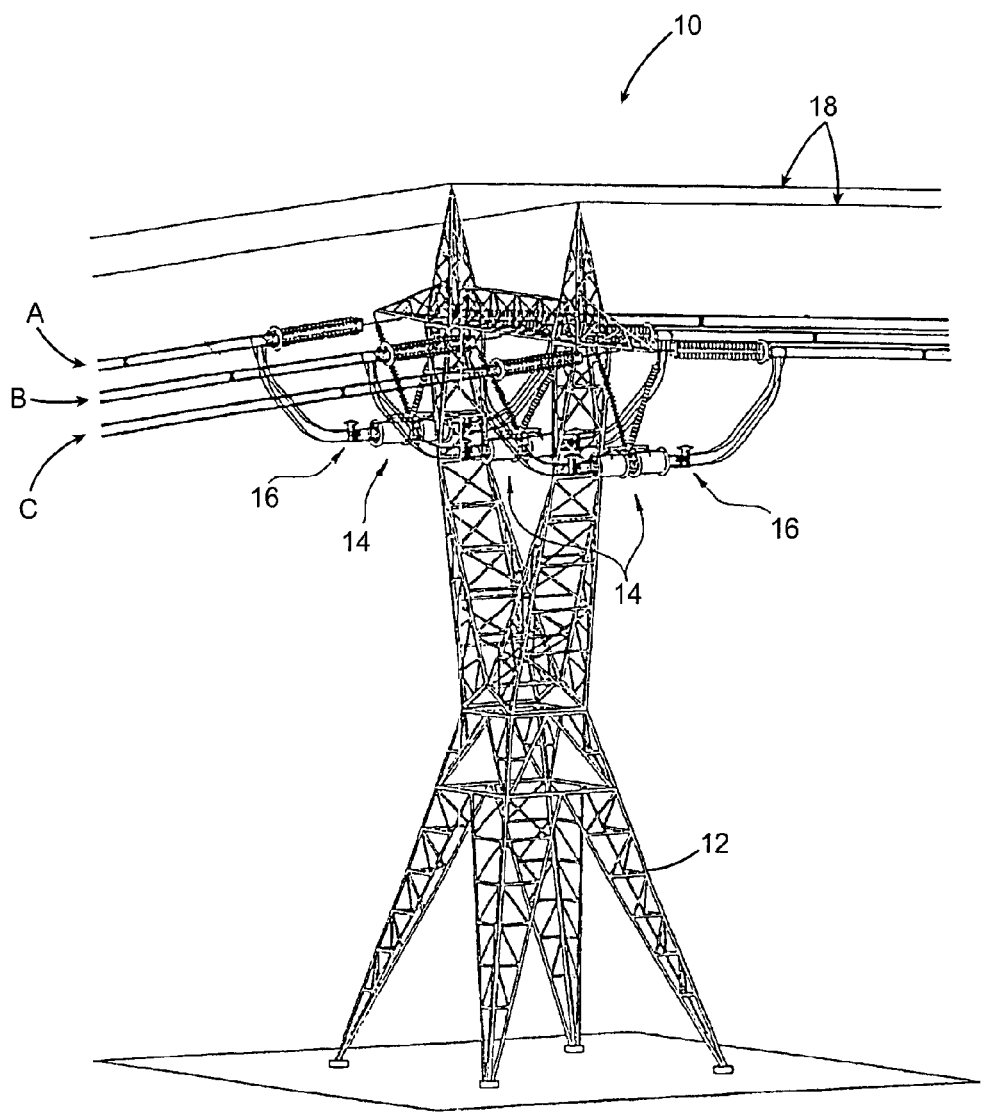
FIG. 1 is perspective view of an anchor tower, provided with back-to-back switching modules, according to the prior art.
Figure 2:
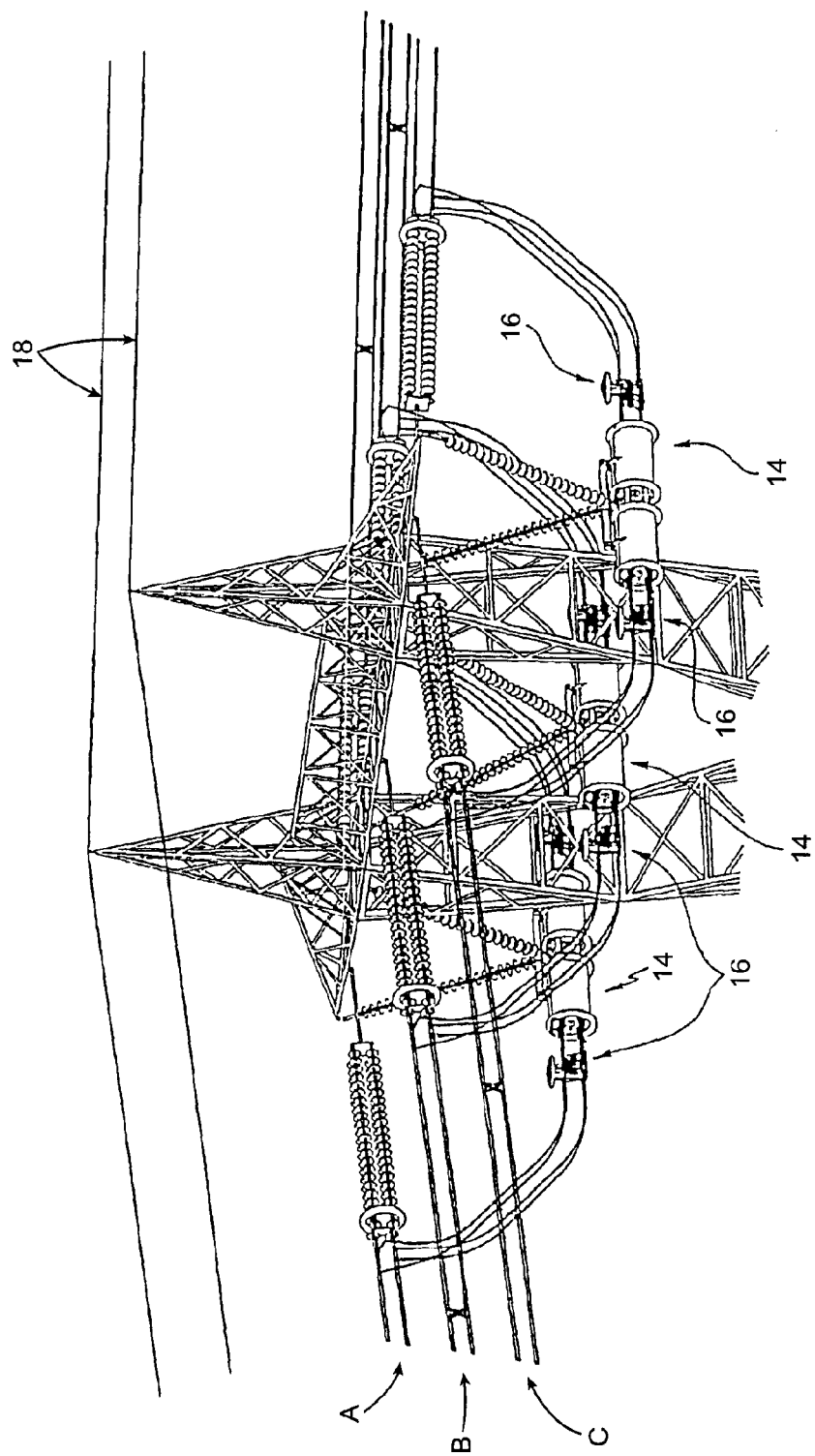
FIG. 2 is an enlarged view of the top portion of FIG. 1.

Although the communication system described in the background section allows the exchange of information between switching apparatuses having different potentials, there are several drawbacks associated with such system.

Firstly, it would be highly desirable if switching apparatuses could perform locally a portion of the functions generally performed at the remote, centralized control system. In order to achieve control in real time of the network, it would be more efficient if some of the control of the mini-substations and of the grid is performed locally by the switching apparatuses, rather than having to wait for instructions from the remote control system.

Secondly, it is known that computations involved in the monitoring, management and control of high-voltage electrical networks are considerable. It would thus be very advantageous to use the processing power of the switching apparatuses for performing at least a portion of these computations.

The communication systems currently used in switching apparatuses do not allow for a distribution of the control, monitoring, computing and protective functions amongst several switching modules. The possibility of transferring some of the control and computing functions directly in switching apparatuses was not considered, mainly because RF signals are affected by electromagnetic perturbations, such as solar storms and also because they are subject to ill-intentioned intrusions. For obvious reasons, electrical networks must be extremely reliable, and a portion of the control, monitoring and protection functions cannot be transferred from a centralized control system to the switching apparatuses if the latter can be affected by electromagnetic disturbances or by unauthorized intrusions, and if the computation capacity is inadequate. Existing switching modules currently do not possess enough computing power to allow proper distribution of the control and protection of the network and the RF band is too small to be used to transmit voluminous data. Furthermore, GPS, just like RF signals, can be affected by solar storms and unauthorized intrusions. Existing switching apparatuses depend on GPS for timing purposes, and thus they can be affected by a malfunction of the GPS.

In order to transfer some of the control of the electrical network from the remote control system to the switching apparatuses, communications between neighbouring apparatuses must be as robust as possible, especially during solar or ice storms, and in times of harsh weather.

In the following description, similar features in the drawings have been given similar reference numerals. In order to preserve clarity, certain elements may not be identified in some figures if they are already identified in a previous figure.

Figure 3:
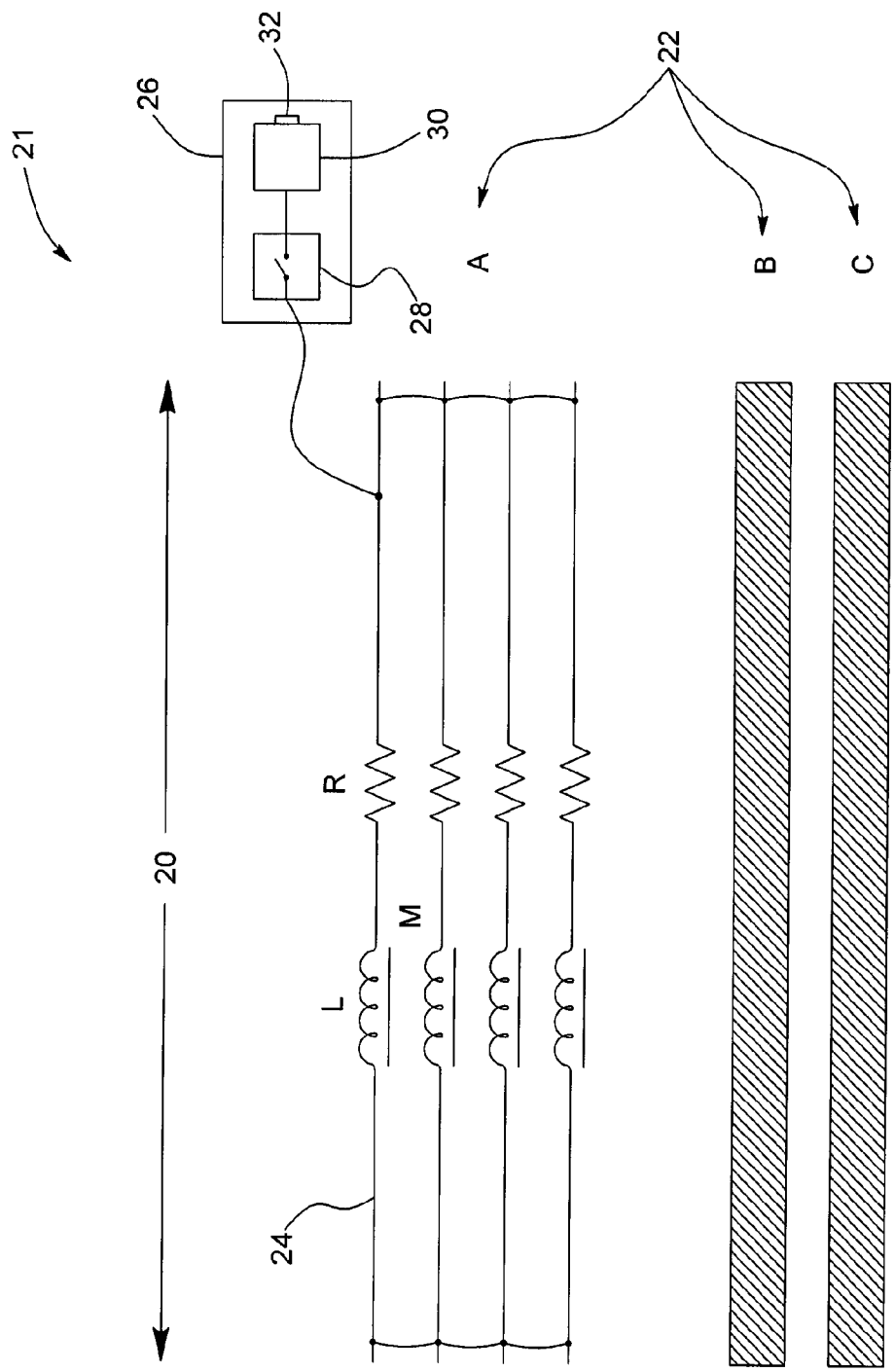
FIG. 3 is a schematic view of a switching apparatus according to a preferred embodiment of the invention, within its environment.

Referring to FIG. 3, a segment 20 of an electrical power line 21 having three phases A, B and C is shown. Each phase line 22 includes four conductors 24 which are electrically insulated from each other, and short-circuited together at two ends of the segment 20. A segment 20 typically corresponds to a portion of the power line. In a 735 kV power network, segments are generally spaced apart by about 30 km, and mini-substations are spaced apart by about 60 km.

A switching apparatus 26, sometimes referred to as switching module, is linked to one of the conductors 24 of phase line A. This switching apparatus 26 is for varying the impedance of phase line A. It includes a controllable switching device 28 connected to the conductor 24, and a controller 30 for performing a control of the switching device 28. The switching device allows modifying the current flow within the conductor, 24 for purposes such as de-icing. The controllable switching device 28 is any device which is able to modify the flow of current within a conductor, and includes at least one of a mechanical switch, an electro-mechanical switch, a vacuum interrupter and an electronic switch, or any combination of these.

While the electrical power line 21 illustrated is a three phase lines A, B, C, the switching apparatus 26 of the present invention can also be used on a High-Voltage Direct-Current (HVDC) line. It is also worth mentioning that each phase line 22 can include a different number of conductors 24, typically varying between 1 and 12. Also, while the switching apparatus 26 shown is connected to only one of the conductors 24, the switching apparatus is preferably connected to each conductor 24 of the phase line 22, such as the example shown on FIG. 1 for example. Of course, in this case the switching module would include a controllable switching device 28 for each conductor.

Still referring to FIG. 3, the controller 30 has at least one optical port 32. The controller 30 is preferably a processor, including a CPU and a memory, and is accessed directly via the optical port. While it is preferable to include the optical port 32 directly on the processor, it can also be considered to use a processor with electrical interconnects, and to use an electrical-optical interface to receive and send optical signals to/from the processor.

The optical port 32 allows for a bidirectional transmission of data, for receiving first optical signals and for sending second optical signals. The first optical signals received include information on which the control of the switching device 28 is based. This control can be for example to leave the switching device in its current state, to open it or to close it. The second optical signals include information of the status of the switching apparatus 26, upon which a control of adjacent switching apparatuses can be based.

By adjacent switching apparatuses, it is meant not only switching apparatuses that are directly connected to one another, but also apparatuses which are in a close environment from one another. It is worth noting that at the scale of an electrical power network, a switching apparatus can be several kilometers away from another adjacent switching apparatus.

Using an optical port 32 on the controller advantageously allows to access directly the processor, without being affected by electromagnetic interferences, which would otherwise affect the proper functioning of a prior art apparatus provided with an infrared or RF communication device. The optical port 32 also allows to increase the speed at which the data transits from one apparatus to another.

Advantageously, having a switching apparatus which includes a controller, itself provided with at least one optical port, allows to link two switching apparatuses via an optical fiber, even if they are at different potentials. Connections of the switching apparatus via optical fibers are also robust to electromagnetic noise, as well as to unauthorized intrusions in the system.

Figure 4:
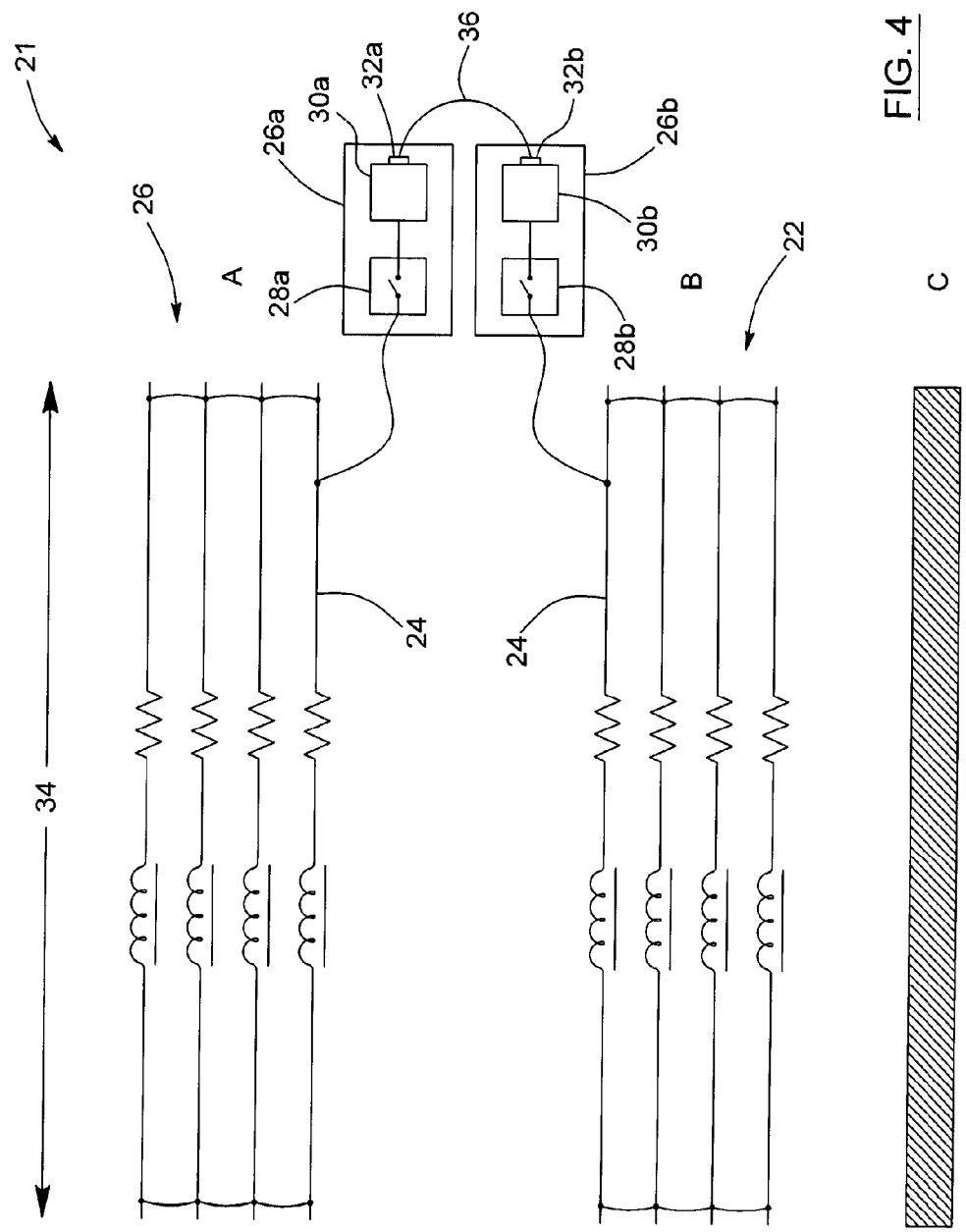
FIG. 4 is a schematic view of a system with two switching apparatuses according to a preferred embodiment of the invention, within its environment.

Referring to FIG. 4, another segment 34 of the electrical power line 21 is shown. The two phase lines A and B are each formed by four conductors 24, and each phase line 22 is provided with a switching apparatus 26 as described above. The first switching apparatus 26a can vary the impedance of phase line A, while the second switching apparatus 26b can vary the impedance of phase line B. The switching apparatuses 26a, 26b include respective controllable switching devices 28a, 28b and respective controllers 30a, 30b. The optical port 32a of the first switching apparatus 26a is connected to the optical port 32b of the second switching apparatus 26b via a first optical fiber 36. This configuration advantageously allows for both switching apparatuses 26a, 26b exchanging optical signals with one another. Of course, when in use, at least one, and preferably both switching apparatuses 26a, 26b are linked to an external control system, and to other adjacent switching apparatuses.

Figure 5:
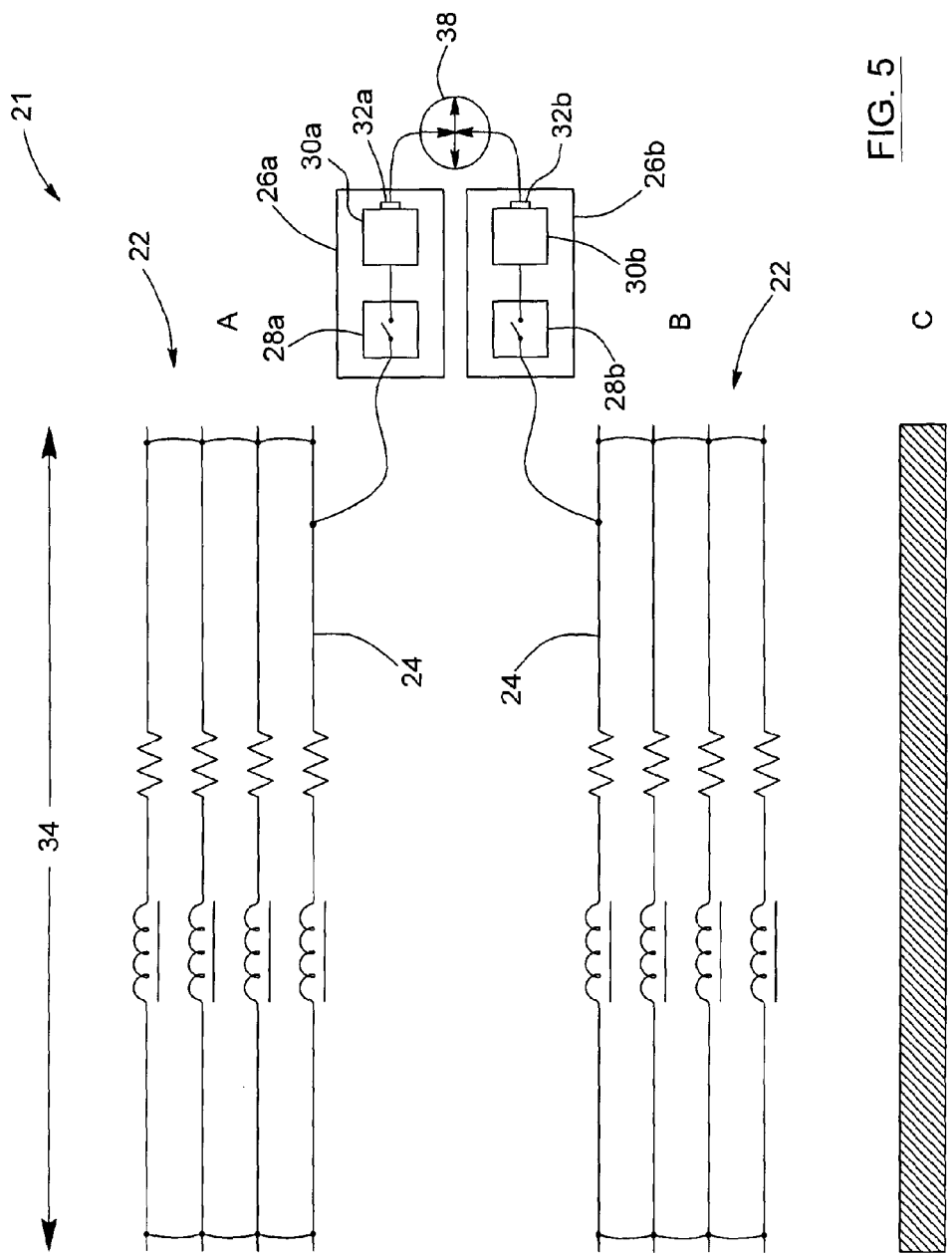
FIG. 5 is a schematic view of a system, according to a preferred embodiment, within its environment.

Referring to FIG. 5, the system depicted is similar to the one shown in FIG. 4, to the difference that the first and second switching apparatuses 26a, 26b communicate with each other via a router 38. The optical ports 32a, 32b of the switching apparatuses 26a, 26b are connected to the router 38 via first and second optical fibers 40, 42 respectively. Although not shown, the router 38 is for connection to other switching apparatuses, and eventually to a remote control system, which can be located in a standard substation or in a remote, centralized station. The router 38 can be a router provided with optical ports or it can be a junction box of optical fibers. The router can include optical or electro-optical circuits.

Figure 6:
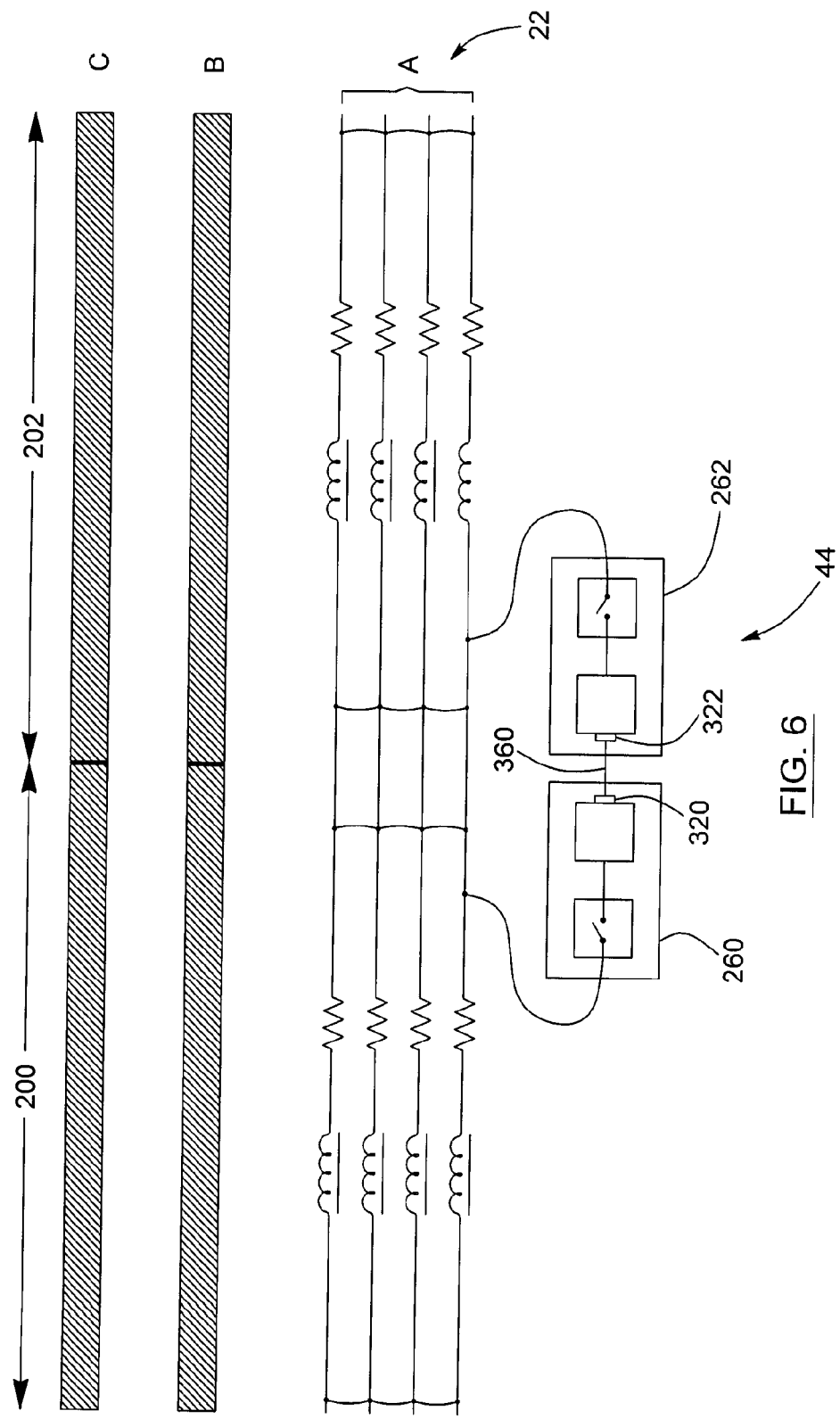
FIG. 6 is a schematic view of a back-to-back system, according to a preferred embodiment of the invention, within its environment.

Referring to FIG. 6, a back-to-back system 44 is shown. This back-to-back system 44 includes two switching apparatuses 260, 262, each being similar to the one shown in FIG. 3, the two apparatuses 260, 262 being in a back-to-back configuration. Each apparatus, 260 or 262, is located on first and second segments 200, 202 of the same phase line 22, in this case phase line A. Although not shown, an anchor tower generally allows the connection of the first and the second segments 200, 202, similarly to the set-up shown in FIG. 1. Still referring to FIG. 6, the second apparatus 262 is located at an extremity of the second segment 202, directly adjacent to the extremity of the first segment 200, where the first apparatus 260 is located. The optical ports 320, 322 of the first and second switching apparatuses 260, 262 are connected to one another with a first optical fiber 360. Although not shown, when in use, at least one of the apparatuses 260, 262 is further connected to an external communication system. Advantageously, assuming a segment 200 or 202 is about 30 km; this configuration advantageously allows placing the back-to-back apparatuses 260, 262 only every 60 km, facilitating installation and maintenance operations of the systems 44.

Figure 7:
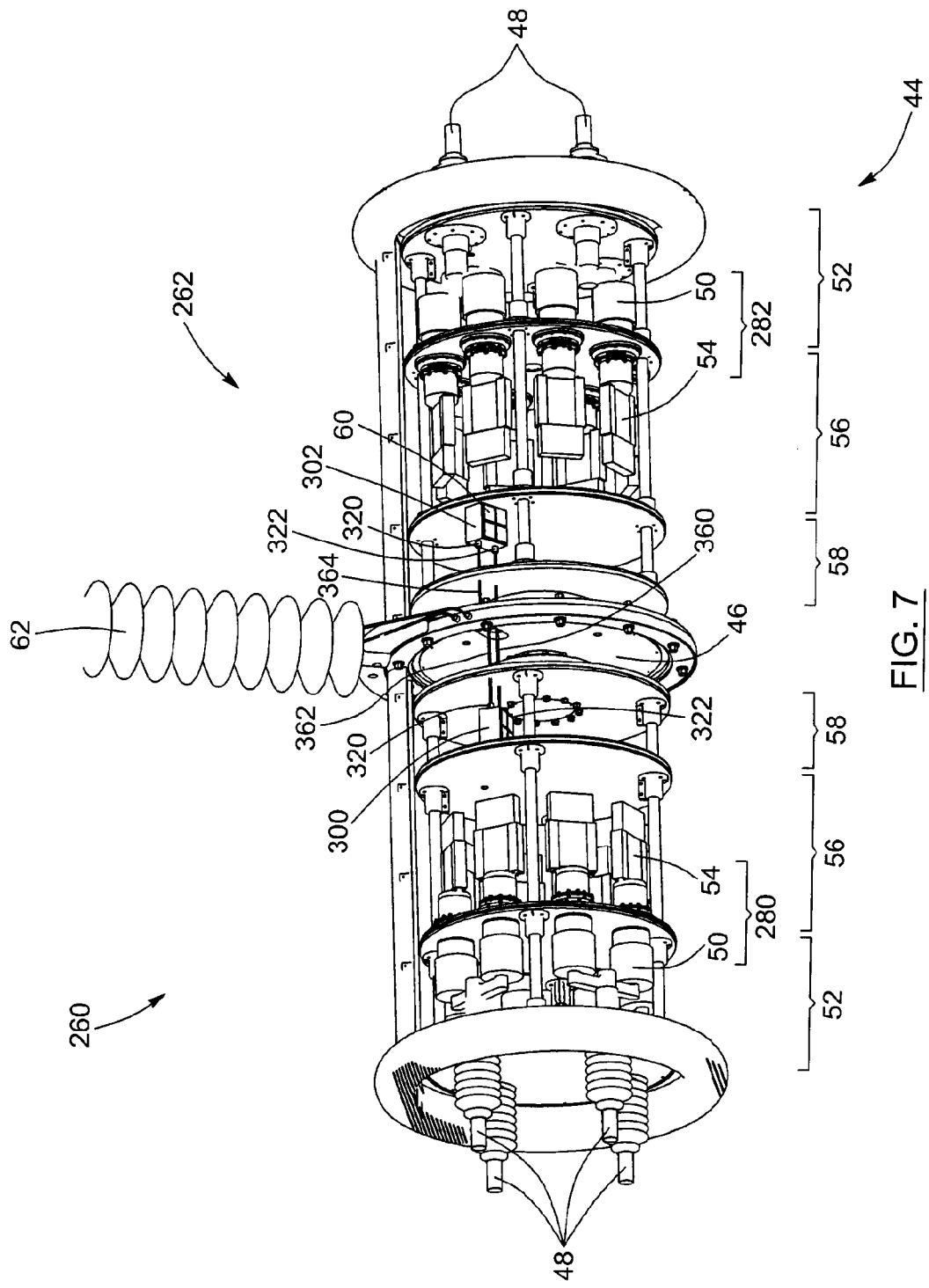
FIG. 7 is a side view of two back-to-back switching apparatuses, according to a preferred embodiment of the invention, within its environment.
Figure 8:
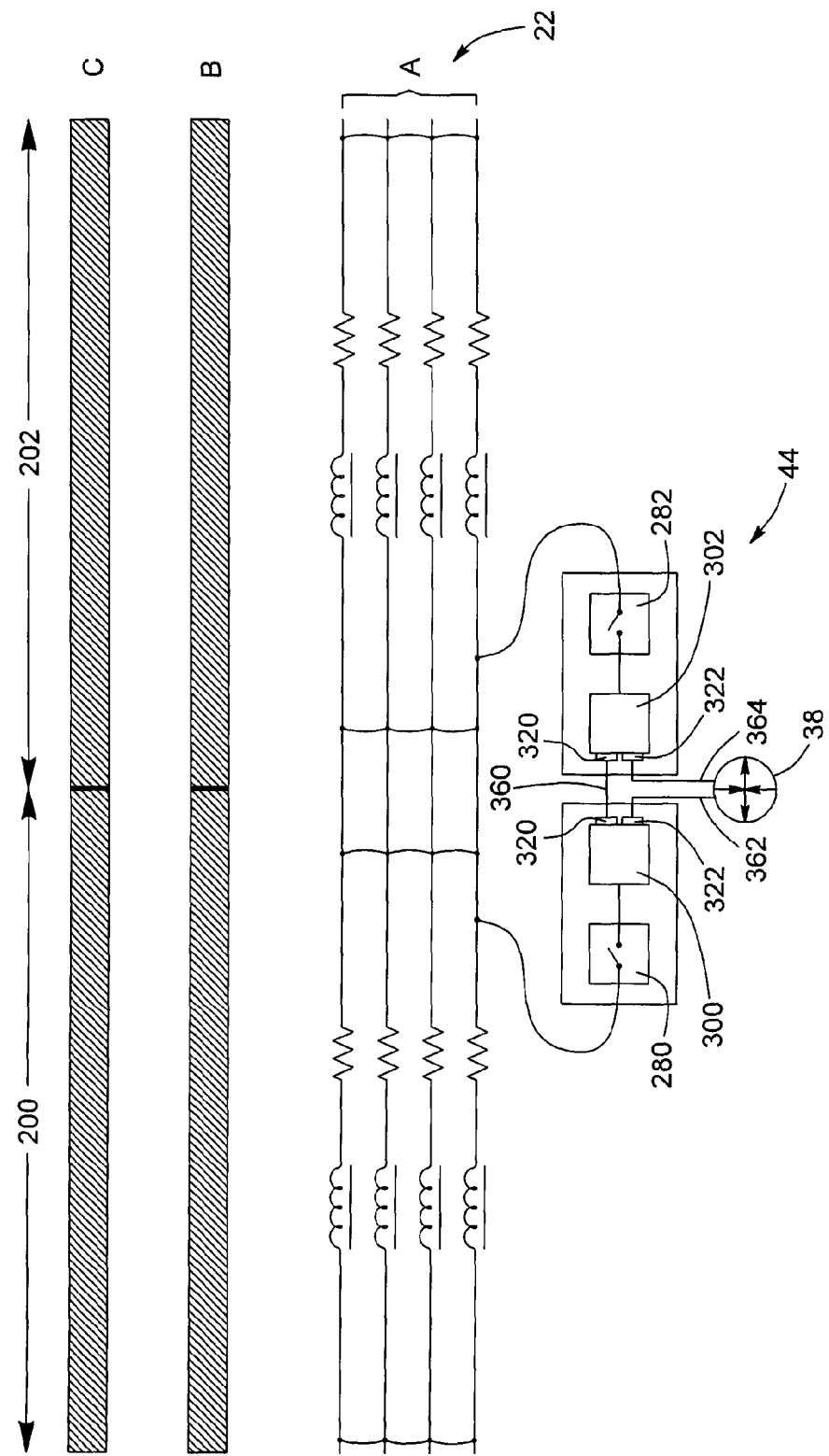
FIG. 8 is a schematic view of a system, according to a preferred embodiment of the invention, within its environment.

With reference to FIGS. 7 and 8, two back-to-back apparatuses 260, 262 are shown, with the protective cover removed so as to better see the components inside. In this embodiment, the two back-to-back switching apparatuses 260, 262 share the same entry plate 46, without having to use connecting rods between the apparatuses. At the outer extremity of the first switching apparatus 260, four conductors 48 are located, each for connecting to one of the conductors of a phase line. Each conductor 48 of the switching apparatus is linked to a controllable switching device 280, in this case a vacuum interrupter 50 located in a first compartment 52. Each vacuum interrupter 50 is in turn connected to a controllable motor 54, located in a second compartment 56, for closing or opening the interrupter 50. In a third compartment 58, a controller 300 is located, and is linked to the controllable switching devices 280. The second switching apparatus 262 has the same configuration that of the first apparatus 260, and includes a controllable switching device 282. Both controllers 300, 302, in this case consisting of a four processors 60 mounted on a single substrate, are provided with two optical ports 320, 322. A first optical port 320 of the first switching apparatus 260 is for connection to the first optical 320 of the second switching apparatus 262 via first fiber 360.

Each controller 300, 302 is further provided with a second optical port 322, for connection to a device or system external to the switching apparatuses 260, 262. A second optical fiber 362 connects in the second port 322 of the first switching apparatus 260, and a third optical fiber 364 connects in the second port 322 of the second switching apparatus 262. In the present case, the second and third optical fibers 362, 364 exit the double switching system 44 through the same insulator chain 62. However, in order to increase the reliability of the system 44, it can be considered to have the second and third fibers 362, 364 through different isolator chains. This way, the reliability of the system 44 would be increased since the fibers 362, 364 use a different path. It should also be noted that in other configurations of back-to-back systems 44, the two switching apparatuses 260, 262 could share a single controller.

Figure 19:
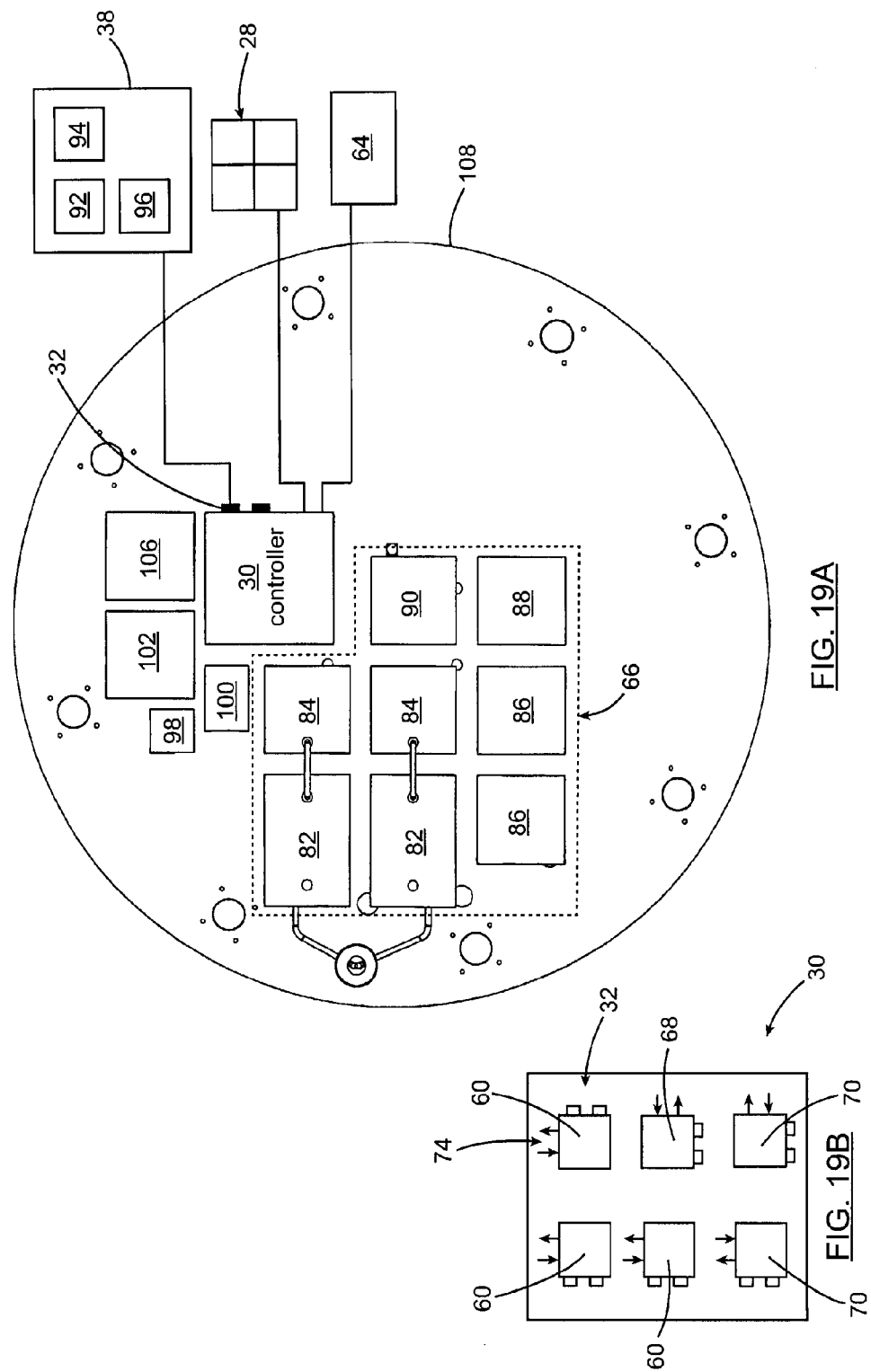
FIG. 19A is a schematic view of some elements of a switching apparatus and a router, according to a preferred embodiment of the present invention.
FIG. 19B is a schematic view of a controller of a switching apparatus, according to a preferred embodiment of the invention.

Referring to FIGS. 7 and 19A, the controller of the switching apparatuses is preferably connected to at least one detector, such as a current detector, a voltage detector and a position detector. The power and control bay 108 can also include an RF transceiver. The parameters detected by a detector 64 and the strain gauge located along the segment through the RF transceiver can be sent to the controller for computing network parameters.

The power and control bay 108 also includes powering modules 66. In the case of a back-to-back system 44, the powering modules 66 of the apparatuses 260, 262 are preferably connected together with an electrical wire. This configuration increases the redundancy of the power supply of the apparatuses 260, 262, and is possible in a back-to-back configuration since both modules are at the same potential.

Back to FIG. 7, the controllers 300, 302 each includes three processors 60 operating in parallel and connected to one another. Computations are performed simultaneously and in parallel within each processor 60, and the processors 60 compare amongst themselves their results. If one of the values computed by a processor 60 is different than the values computed by the two other processors 60, the processor 60 having computed the erroneous value is discarded, to ensure that the computations of the controller 30 are always reliable. In order to achieve this, each processor 60 includes means for comparing three values of a given parameter and means for discarding one of said values when said one value is incoherent with the remaining two values.

Referring now to FIG. 19B, a controller 30 further comprises a stand-by processor 68. This stand-by processor 68 is linked to each of the three processors discussed previously, and is activated, or used, when one of the three values is discarded, in replacement of the processor 60 which has computed the erroneous value. The controller 30 can further include at least an additional processor 70, for performing specific computations of parameters of the electrical power line. Of course, all processors 60, 68, 70 are all linked to one another. The connections between processors are not shown to preserve clarity of this FIG. 19B.

Figure 9:
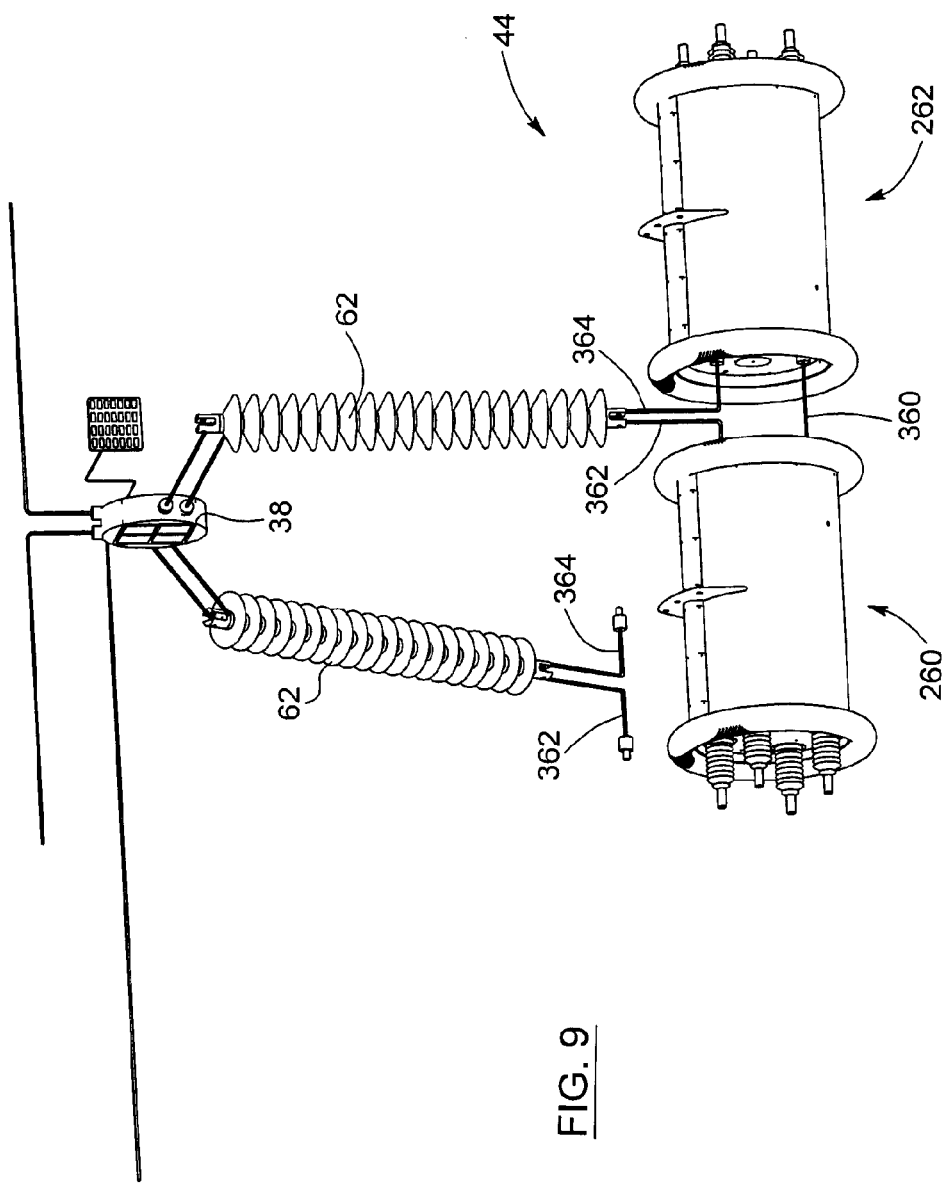
FIG. 9 is a side perspective view of a back-to-back switching system, according to a preferred embodiment of the invention, within its environment.

Now referring to FIGS. 8 and 9, a back-to-back system 44 is shown in combination with a router 38. A first fiber 360 connects a first optical port 320 of the first apparatus 260 with a first optical port 320 of the second apparatus 262. Second and third optical fibers 362, 364 connect the second ports 322 of the first and second switching apparatuses 260, 262 to the router 38, the second and third fibers 362, 364 passing through an insulator string. The back-to-back system 44 is for connection on two adjacent segments 200, 202 of a phase A.

In FIG. 9, the second and third fibers 362, 364 of a second back-to-back system (not appearing in FIG. 9) are shown, unconnected. In use, all three phases A, B, C are connected to back-to-back systems 44, as it will be described more in details with reference to FIG. 11. It should be noted that in other embodiments of the invention, it can be consider including the router 38 integrated within the controller. In this case the routing capabilities would be performed by the controller, and the controller would include more optical ports to connect directly with other controllers having routing capabilities, with other routers, or with an optical fiber running in the ground wire.

Figure 11:
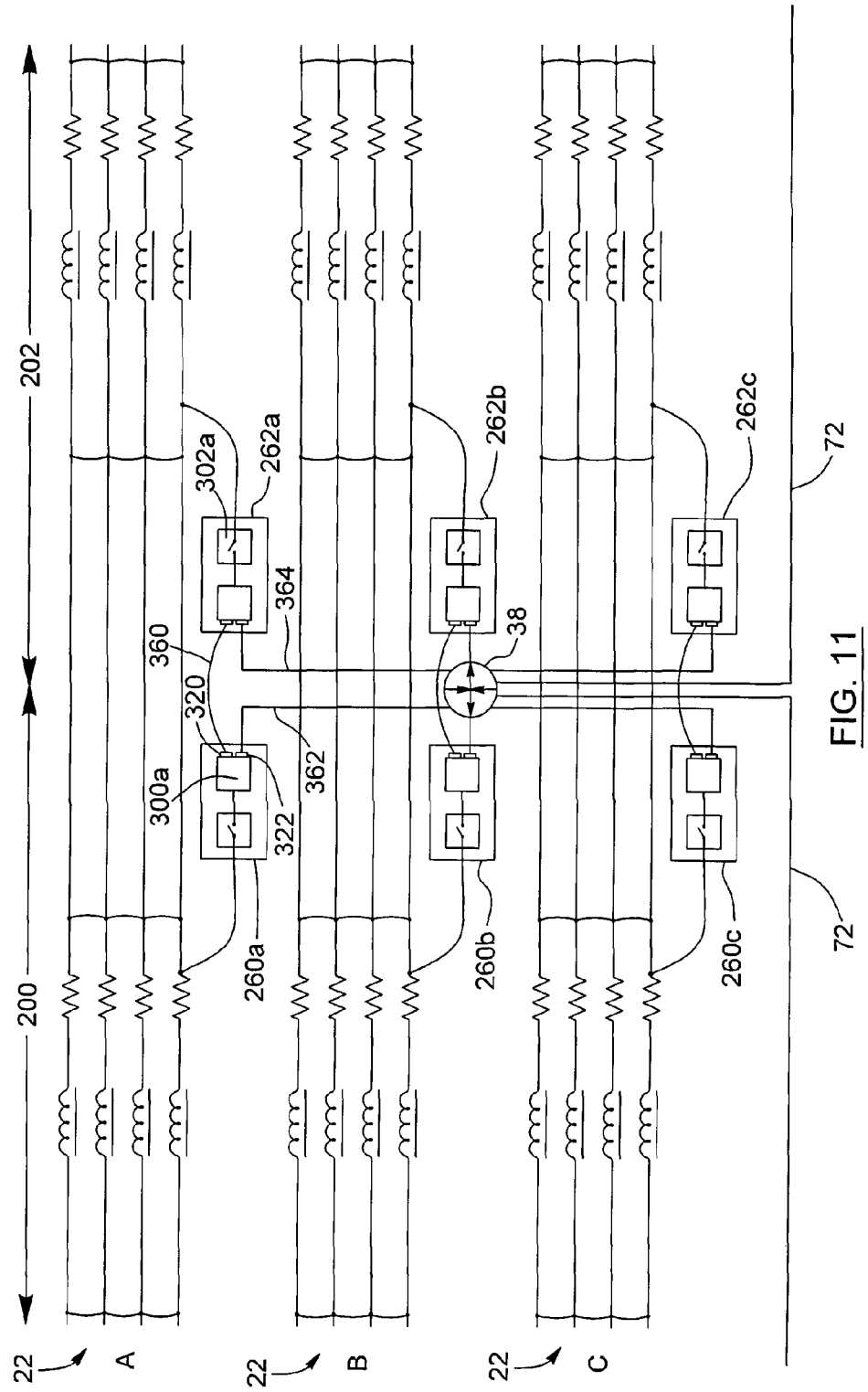
FIG. 11 is a schematic view of a system, according to a preferred embodiment of the invention, within its environment.
Figure 12:
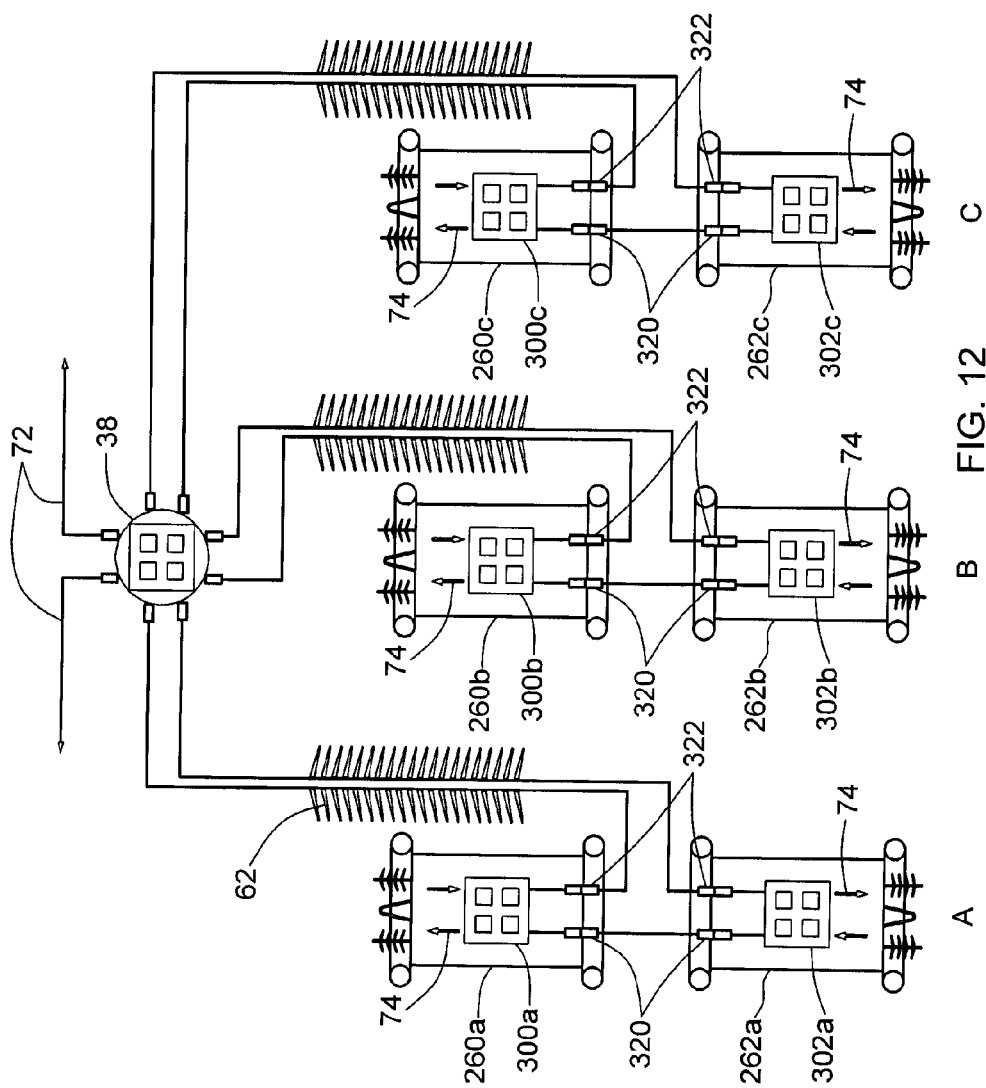
FIG. 12 is a schematic view of a system, according to a preferred embodiment of the invention, within its environment.

As shown in FIGS. 11 and 12, the router 38 advantageously allow to interface the controllers 300a, 302a of the pair of back-to-back switching apparatuses 260a, 262a hooked on phase A to the other two back-to-back systems 260b, 262b, 260c, 262c connected to lines B and C, but also to a main optical fiber 72 which is ultimately connected to the next router of the power line, or to a remote control station (not shown). Similar connections are made on the back-to-back switching apparatuses of phases B and C. A router or junction box of fibre optics is used to connect the six fibre optics of the processors of the six switching modules of the three phases A B C to the other routers of the same mini substation of the other transmission-lines in the same corridor. It also allows them to connect to the other routers of the other mini substations of the transmission-line and to the system control center with the aid of fibre optic ground wire or other fibre optics in a manner that is redundantly safe and reliable. The router can be composed of optical circuits or electro-optical circuits. A router can provided with optical ports or it can be a junction box of optical fibers. The router can include optical or electro-optical circuits. More specifically, each of the apparatuses 260, 262 is provided with first and second optical ports 320, 322. For each pair of first and second apparatuses 260, 262, the first optical port 320 of the first apparatus 260 is connected to the first optical port 320 of the second apparatus 262 via the first optical fiber 360; and the second optical ports 322 of the first and second apparatuses 260, 262 are connected to the router 38 via second and third optical fibers 362, 364. As it can be appreciated, the controllers of all six switching apparatuses 260a, 260b, 260c and 262a, 262b, 262c are able to send and receive said first and second optical signals via the router 38. With this configuration, the controller of a switching apparatus is always provided with two connections, providing the system with increased redundancy and reliability.

Still referring to FIGS. 11 and 12, the main optical fiber 72 is an optical link relayed from one router 38 to the next, which is generally located in the earth wire (not shown) running along the first and second segments 200, 202. The main optical wire 72 ultimately connects to a remote control system (not shown), which monitors and controls the operation of the high-voltage electrical network. Of course, the main optical fiber is not necessarily located in the ground wire.

Referring to FIG. 12, each controller 300a, 300b, 300c, 302a, 302b, 302c is provided with input and output buses 74, in addition to the optical ports 320, 322, in order to receive and send information from/to other types of devices (not shown) such as sensors, switching actuators and RF transceiver, for example. Such devices are located within the switching apparatus, to provide information to the apparatus relative to the current, the voltage or the ice load of the conductor. In this configuration of the system, the second and third optical fibers 362, 364 pass through the same insulator chain 62. However, in order to increase the redundancy, it may be preferable to have these fibers to pass though different insulator chains.

Figure 10:
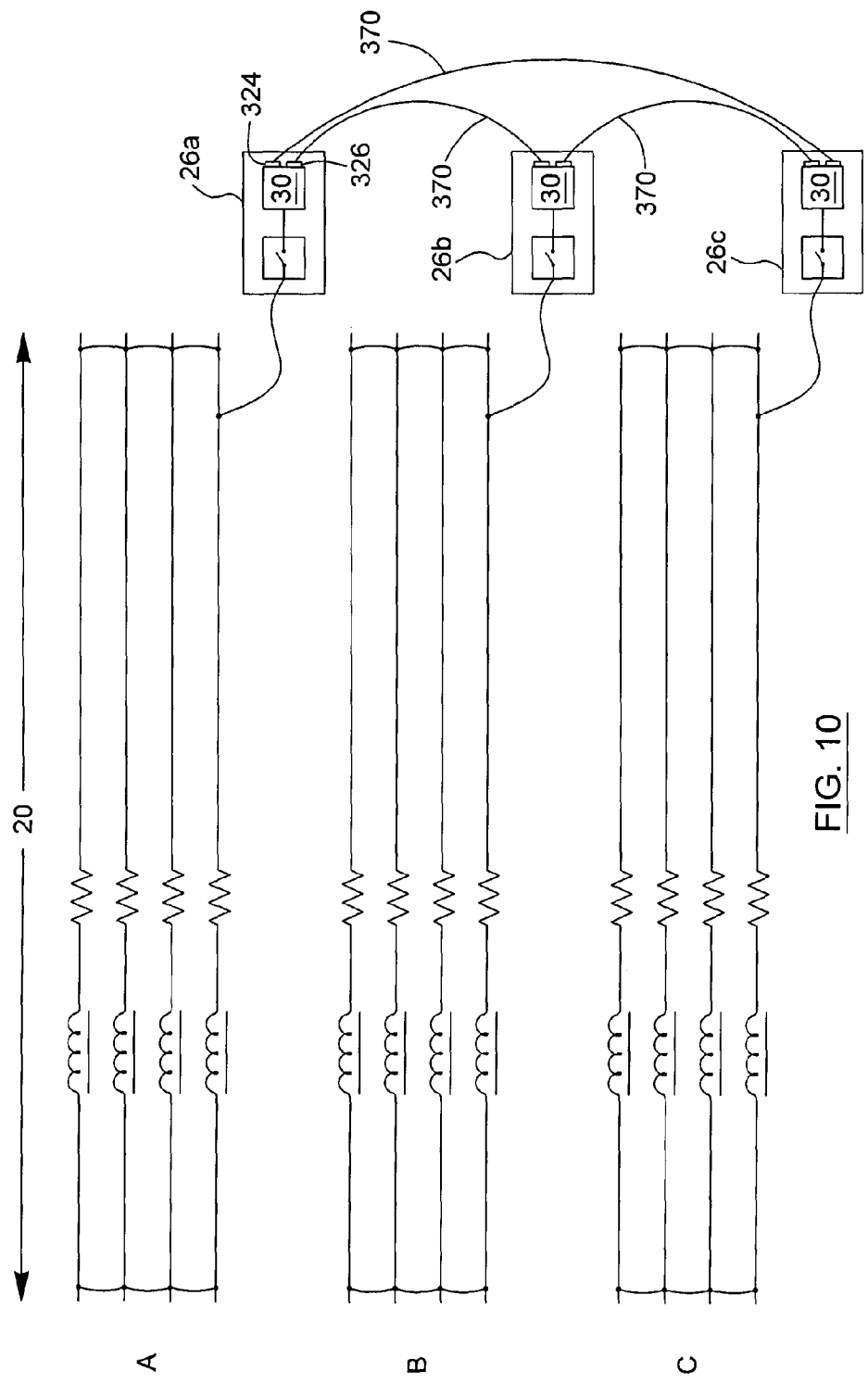
FIG. 10 is a schematic view of a system, according to a preferred embodiment of the invention, within its environment.

Now turning to FIG. 10, another type of distributed system is shown. In this configuration, the switching apparatuses 26a, 26b and 26c are not in a back-to-back configuration. For apparatus 26a, the first optical port 324 is connected to an optical port of the switching apparatus 26c by means of an optical fiber 370, and its second optical port 326 is connected to the optical port of the switching apparatus 26b. The same types of connections are made for apparatus 26b and 26c. In this distributed system, the controllers 30 of the three switching apparatuses are able to communicate with one another via the optical fibers 370. Of course, in operation, at least one of the switching apparatuses 26a, 26b or 26c would also be connected to an external device, to communicate with other switching apparatuses of adjacent towers, and with the remote control system. This distributed system also provide the redundancy and reliability required to transfer some of the control, computation and monitoring functions from the remote control system locally, directly in the switching apparatuses.

Figure 13:
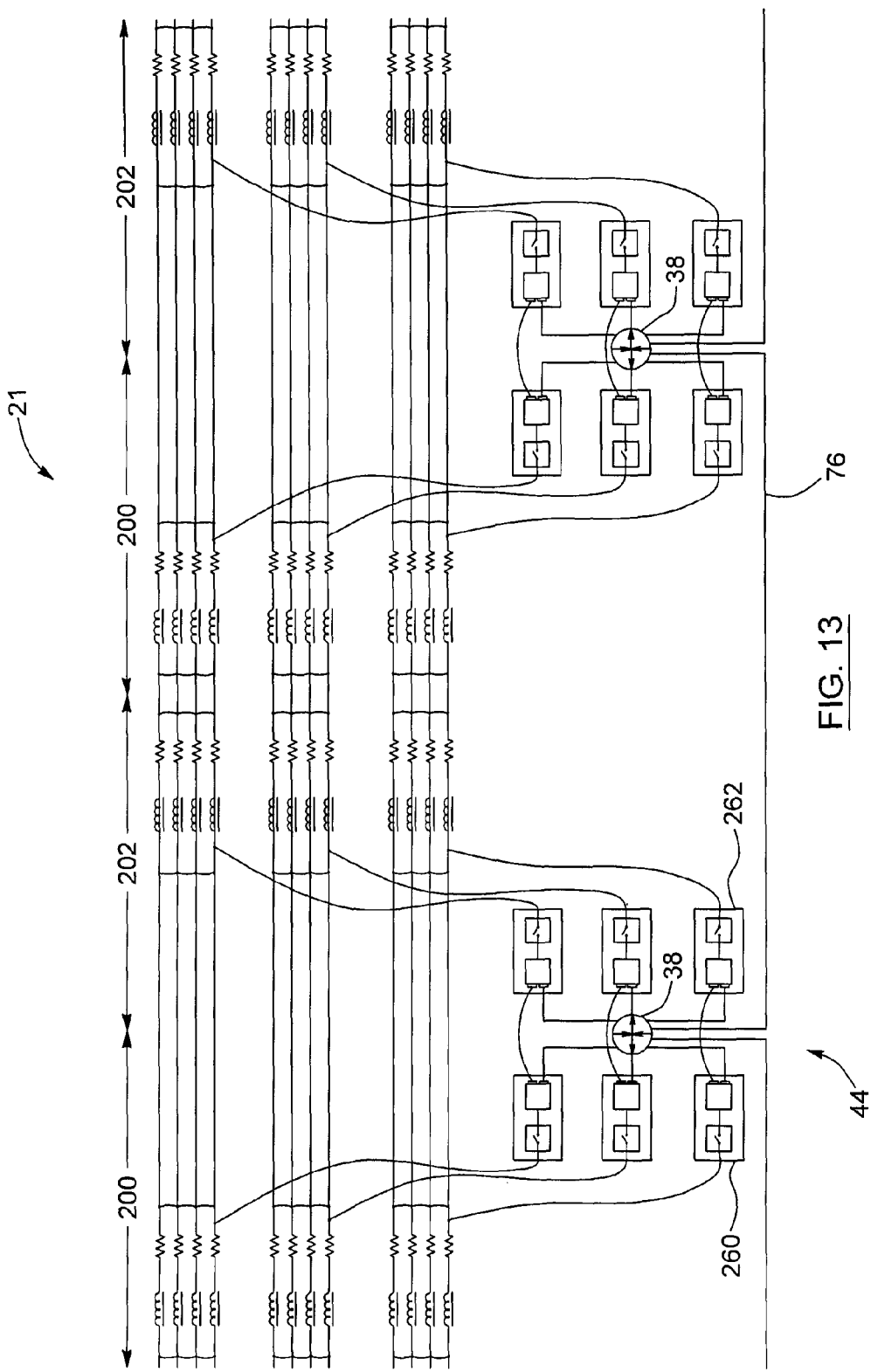
FIG. 13 is a schematic view of a system, according to a preferred embodiment of the invention, within its environment.

Referring to FIG. 13, a distributed system for varying an impedance of different segments 200, 202 of an electrical power line 21 is shown. The segments illustrated represents segments from a middle section of an electrical power line 21, paired in first and second segments 200, 202, and on which back-to-back switching apparatuses 260, 262 are hooked at the junction of the first and second segments 200, 202. Of course, an anchor tower is required at the junction of segments 200 and 202, but is not illustrated, to prevent burdening of the figure. A router 38 is connected to each of the apparatuses of the back-to-back systems 44, with the same configuration as the systems illustrated in FIGS. 11 and 12. The routers 38 are connected in series with router-to-router optical fibers 74, running along the length of the segments 200, 202.

Figure 14:
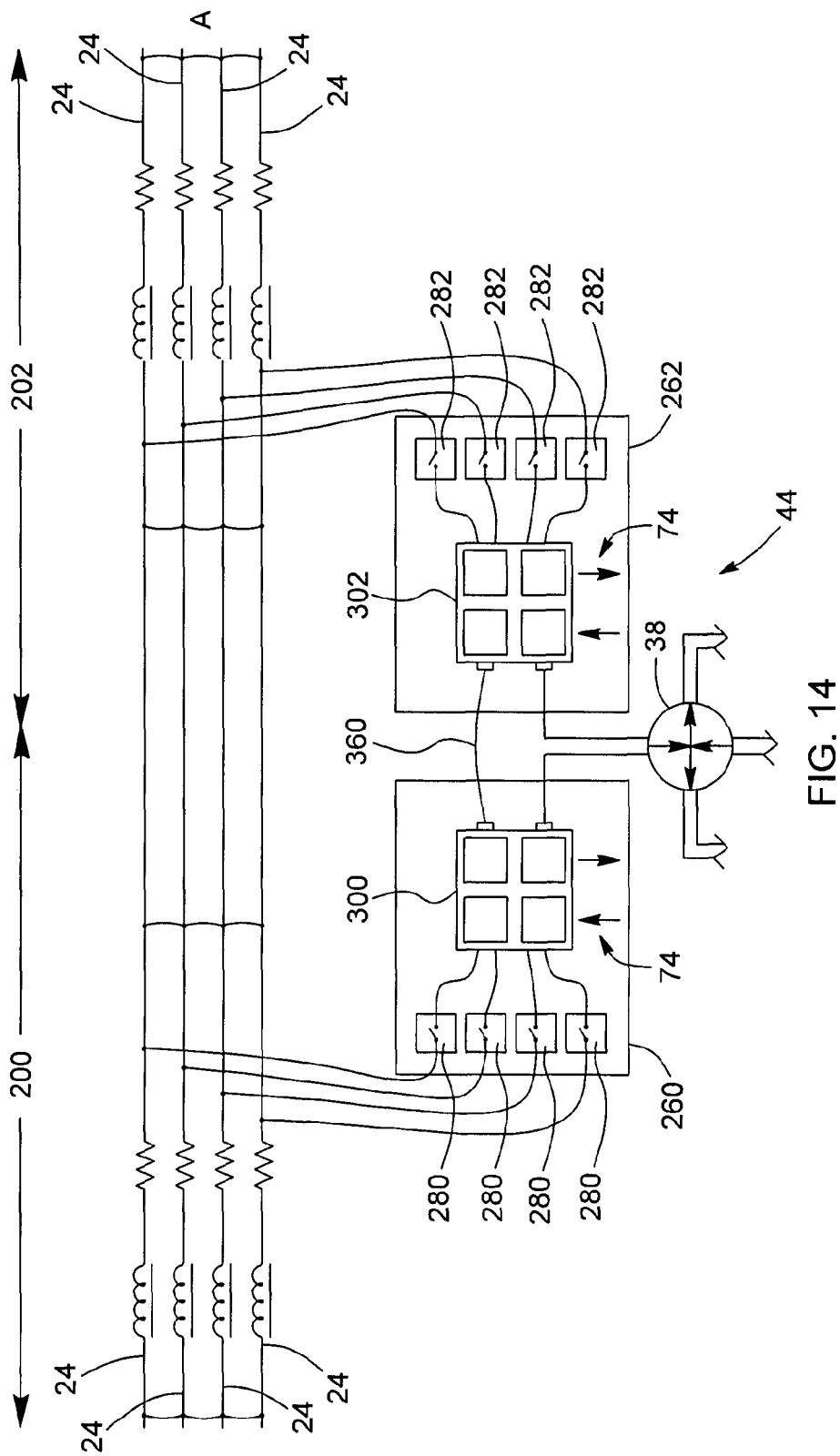
FIG. 14 is an enlarged view of a portion of the system shown in FIG. 13.

Referring to FIG. 14, the connections of a back-to-back system 44 with first and second segments 200, 202 are best shown. On the first segment 200, each of the four conductors 24 is connected to a controllable switching device 280 located within the switching apparatus 260. The controllable switching devices 280 are in turn connected to the controller 300. The same connections are made on the second segment 202. Both controllers 300, 302 are connected together via a first optical fiber 360. Each controller 300, 302 is also connected to the router 38. Three other pairs of optical fibers are partially shown, two of the pairs being for connection to the back-to-back systems of the other two phase lines, and the third pair being for connection to the routers of adjacent segments.

Figure 15:
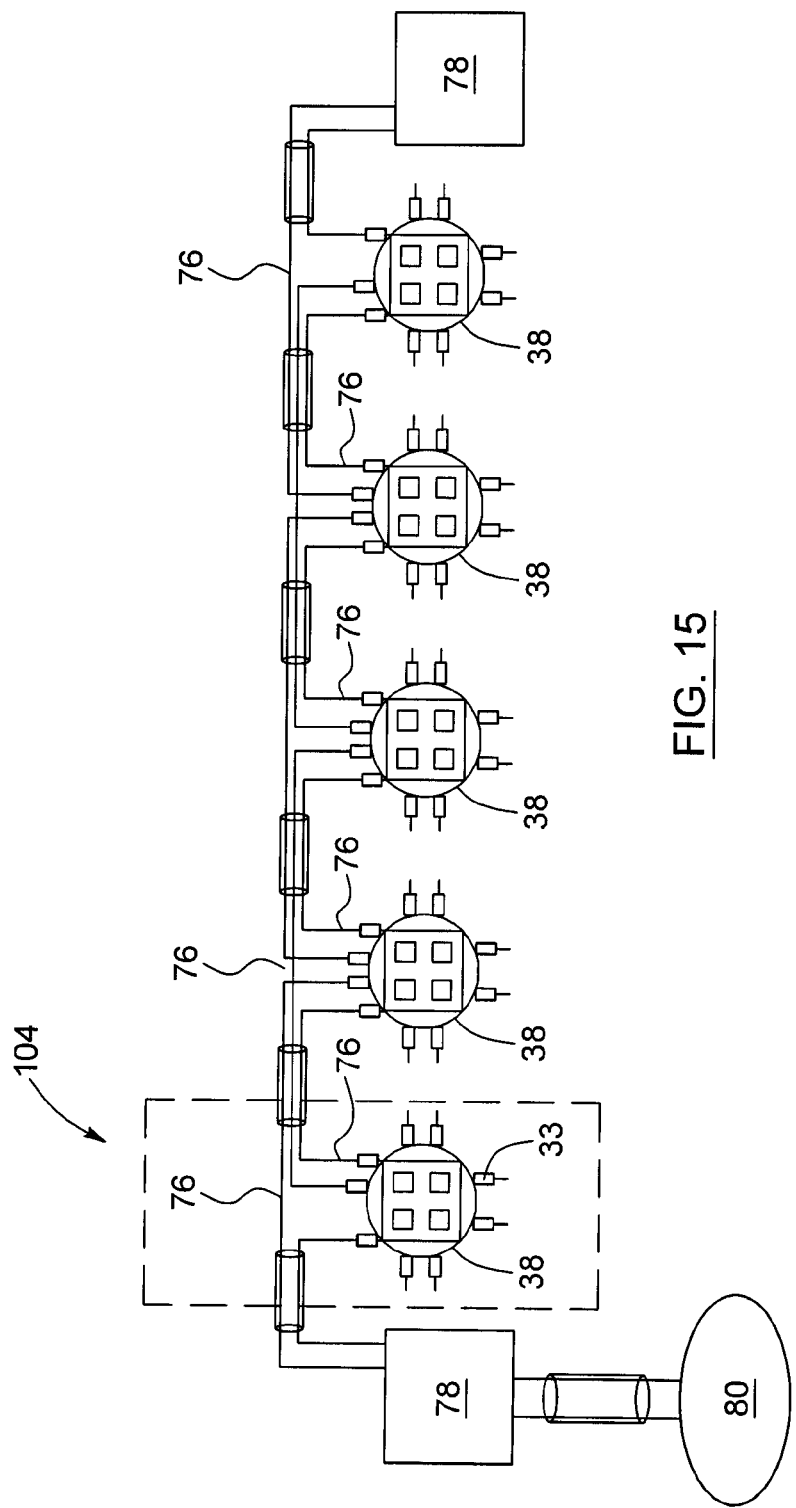
FIG. 15 is a schematic view of a system, according to a preferred embodiment of the invention, within its environment.

Referring to FIG. 15, five routers 38 are shown, each part of a mini-substation 104, the three middle routers being associated with pairs of first and second segments, respectively (the segments are not shown to lighten this FIG. 15), and the two outer routers 38 are associated to the outer segments of the portion of the electrical power line extending between two substations. In this configuration of the distributed system, each one of the three middle routers 38 is provided with ten optical ports 33 (only one port 33 is identified on the left most router 38). Of these ten ports, three pairs of ports (shown unconnected) are for connecting to the three back-to-back switching apparatuses 260, 262 hooked on each phase line 22, such as shown in FIG. 11. Two other ports are for connecting with the adjacent routers 38 of segments or of one of the substation 78, via router-to-router fibers 76. Finally, the last two ports are for connecting to second adjacent routers, on the transmission line or of the substations, via two other router-to-router optical fibers 76. The two routers 38 at the extremity of the line are only provided with nine ports, as they are directly adjacent to the substation. One of the substations 78 is connected to a remote control system 80. As it can be appreciated, such configuration further improves the reliability and redundancy of the distributed system. For example, if the entire system located on an anchor tower would come to fail, (a system consisting of three switching apparatuses and router), the remaining systems on the electrical line can continue to function normally, and the communication to the substations or to the remote control system would not be affected by such failure.

Figure 16:
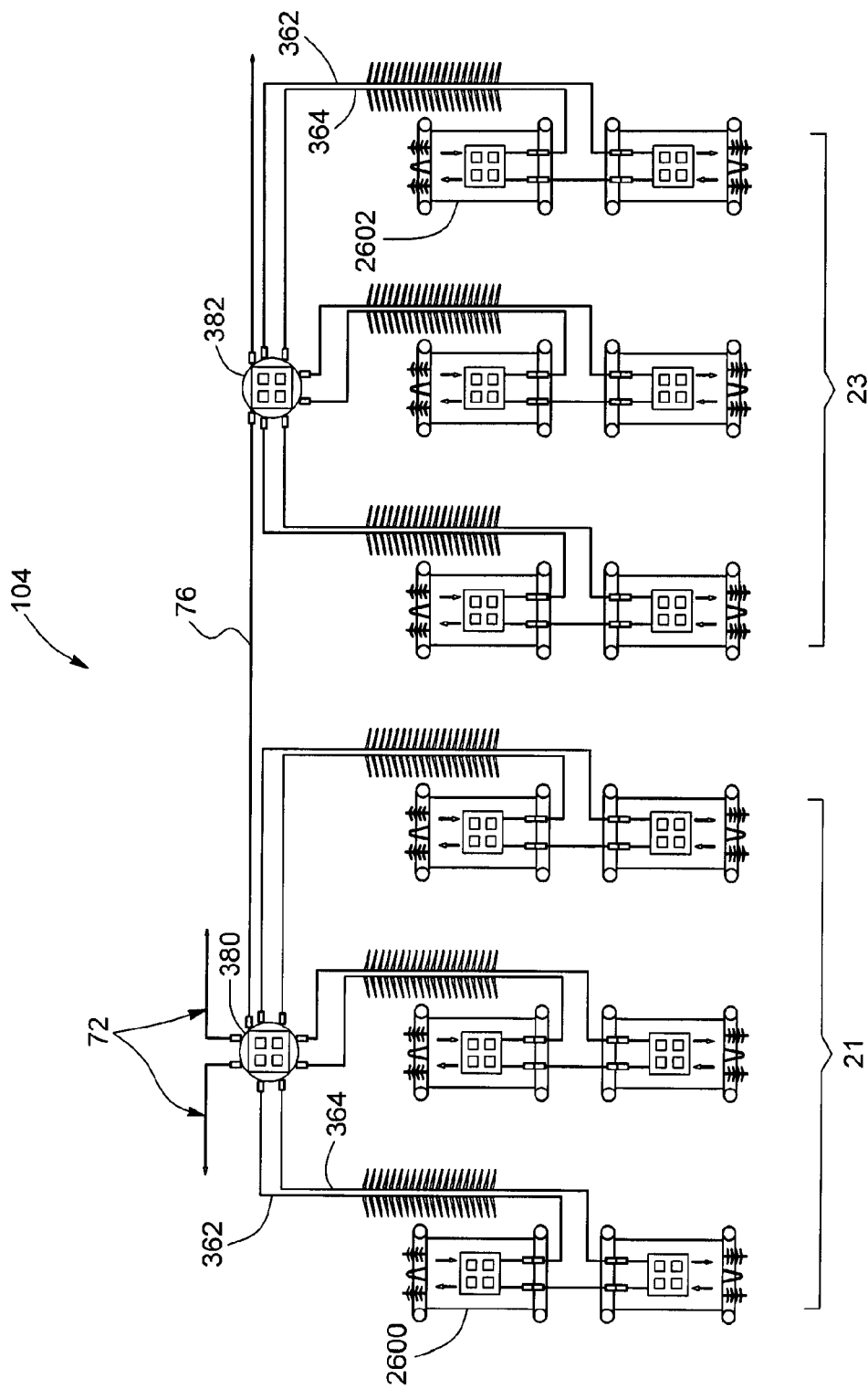
FIG. 16 is a schematic view of a system, according to a preferred embodiment of the invention, within its environment.
Figure 17:
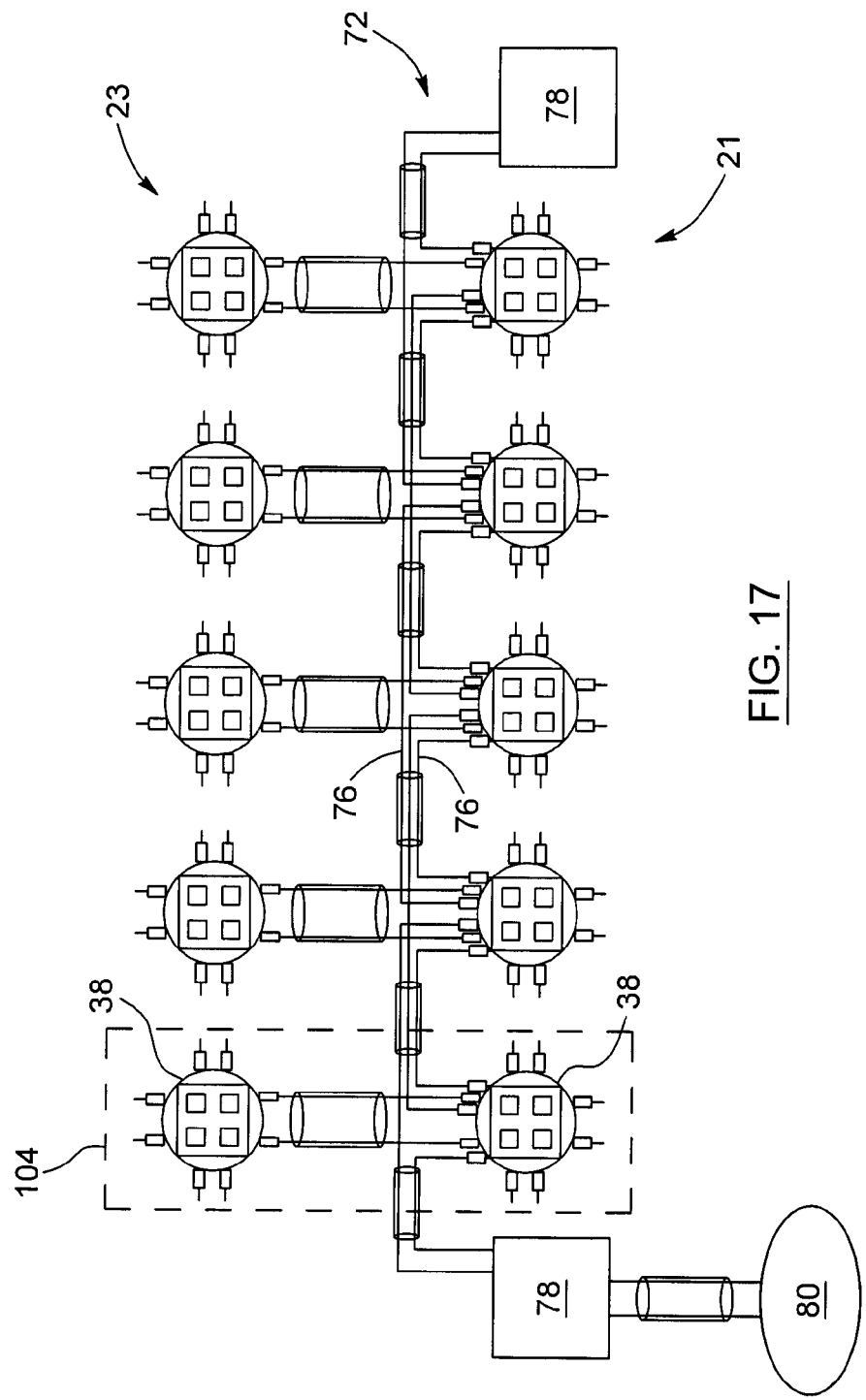
FIG. 17 is a schematic view of a system, according to a preferred embodiment of the invention, within its environment.

Referring now to FIGS. 16 and 17, a bridge system including a first and a second switching apparatuses 2600, 2602 is illustrated. FIG. 16 represents one type of mini-substation 104, including the routers and switching apparatuses of two electrical lines 21, 23, while in FIG. 17, five mini-substations 104 are shown (only one being identified by dashed lines) A bridge system consists of bridging two switching apparatuses 2600, 2602, each located on an independent, parallel and adjacent electrical power line 21, 23. As it is known in the art, it is not uncommon in high-voltage power networks to have two distinct electrical lines running in the same corridor. The first and second apparatuses 2600, 2602 are thus for respectively varying the impedance of segments located on two distinct electrical power lines 21, 23. First and second routers 380, 382 are connected respectively with the first and second switching apparatuses 2600, 2602 via optical fibers 362, 364 and another optical fiber 76 connects together the first and the second routers 380, 382. Best shown in FIG. 16, the router 380 associated with the first electrical power line 21 acts as a master router, and is further connected to a main optical fiber 72, allowing connection of the router 380 to a remote control system 80 (shown in FIG. 17), the router 382 associated with the second power line 23 being a slave router. In other words, each router 380, 382 is used to connect the optical fibers of the processors of the six switching modules of the three phases A B C to the other routers of the same mini substation of the other transmission line in the same corridor. Each router can also be connected to the other routers of the other mini substations of the same transmission-line and to the system control center with the aid of the fibre optic ground wire or other fibre optics in a manner that is redundantly safe and reliable. In the bridged system illustrated in FIGS. 16 and 17, only one of power line 21 has a main optical link 72 running along it. This main optical link 72 is relayed from one router 38 to the next.

Figure 18:
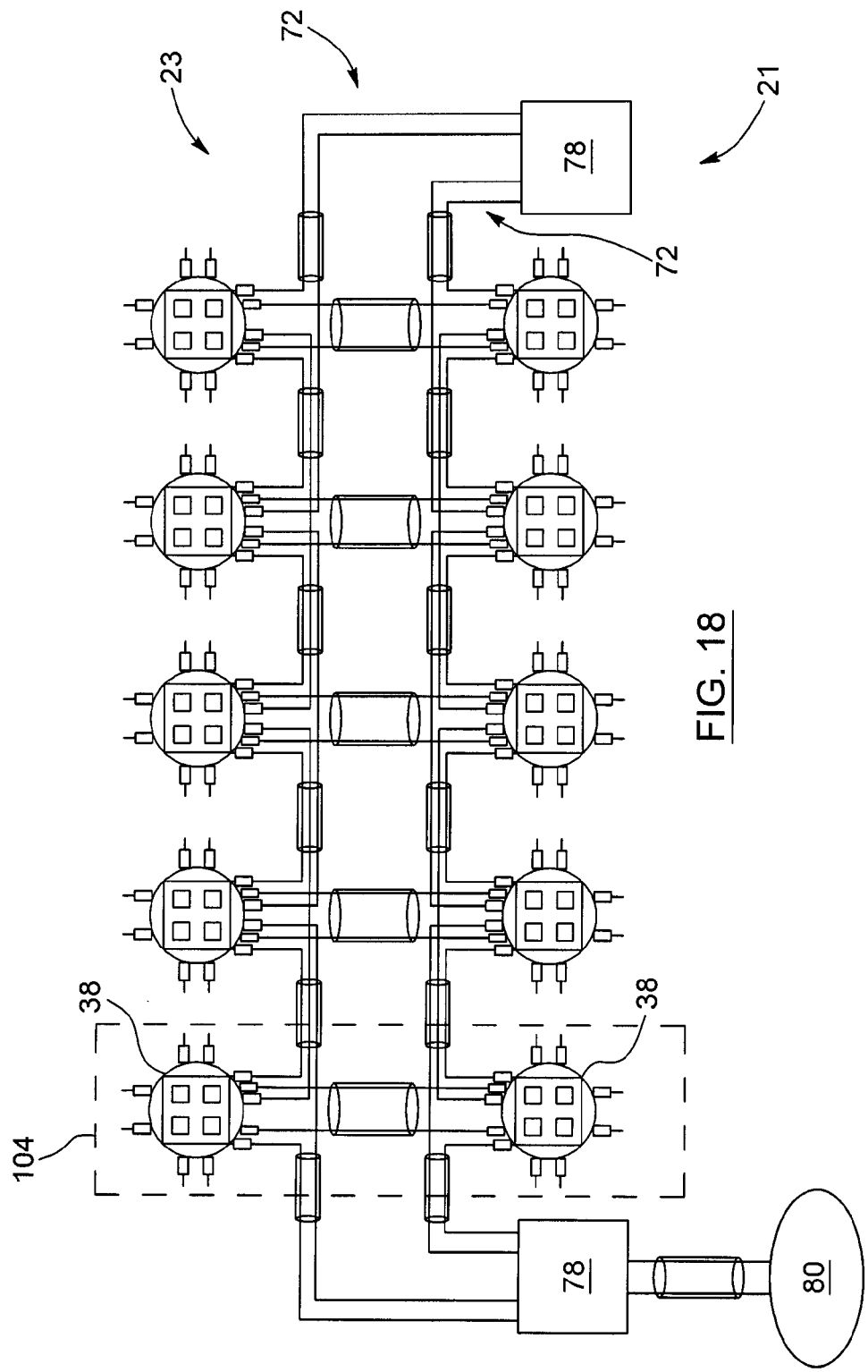
FIG. 18 is a schematic view of a system, according to a preferred embodiment of the invention, within its environment.

Now referring to FIG. 18, a bridged system having two main optical fibers 72 is shown, one on each power line 21, 23. In this embodiment of the bridged system, the apparatuses of both power lines are connected, via the routers 38, to the main optical fibers 72. This configuration yet further increases the number of communication paths, thus increasing the redundancy and reliability of the overall system, as even is an entire portion of one of the electrical power line would come to fail, the remaining switching apparatuses would still be operative and connected to the remote control station.

Referring now to FIG. 19A, the power supply and control system of a switching apparatus is shown. The connection of this system with the controllable switching devices 28 (one for each conductor of a phase line), the sensors 64 and a router 38 are also shown. Functional blocks represent elements which are preferably included in this system. The power and control bay 108 comprises a controller 30, power supply modules 66. The power modules 66 include a capacitive power supply transformer 82, a capacitive power supply 84, an inductive power supply 86, a capacitor box 88, a power distribution box 90. The controller includes at least two optical ports 32, one for connection to the other apparatus of the back-to-back system (shown unconnected), and one for connection to the router 38. The control bay 108 also includes a GPS module 98, a black box 100, a PLC emitter-receiver device 102, and an RF emitter/receiver device 106 to communicate with the sensors located along the segments The router 38 includes a power supply 92, a routing module 94, and a WDM module 96. The WDM module 96 is for multiplexing the second optical signals received from the three switching apparatuses on another optical fiber. Of course, the WDM module is optional and it may be sufficient to use different bands, or colors, of the light spectrum to transmit the optical signals over the fibers. The router 38 includes a power source 92 for supplying it with power to the router, the power source being a solar-based power source. Alternatively, a capacitive coupling device can be considered as a power source. Also described previously, in other variants of the system, it can be considered to include the router within the switching apparatuses, in an additional compartment, or via an additional processor.

Referring to FIG. 19B, a preferred embodiment of a controller 30 is shown. The controller 30 preferably includes six processors 60, 68, 70. The three processors 60 operate in parallel and are connected to one another. Each processor 60 includes means for comparing three values of a given parameter, each value haven been computed by one of the processors. Each processor 60 also includes means for discarding one of the values when the one value is incoherent with the remaining two values. The three processors 60 are used to compute different values of the electrical network and also to control the controllable switching devices. The processors 60 perform the computations simultaneously, in order to ensure that the resulting value is reliable. When one of the values differs from the two others, this situation can indicate that one of the processor has failures, and this processor is discarded.

The controller 30 further includes a stand-by processor 68, the stand-by processor 68 being linked to each of the three processors 60 and being activated when one of the three values is discarded, in replacement of the processor which has computed said one value. In other words, a fourth processor 68, kept as a back-up, can then be activated in order to replace the failed processor.

Finally, a fifth and a sixth processors 70, that is, additional processors, can be used to perform specific network computations.

Of course, the number of additional processors 70 can vary. The processors 60, 68, 70 are each provided with galvanic 74 input/output buses, in addition to the optical ports 32. The electric input/output buses 74 allows for connections to other types of devices, such as sensors and receptors, for gathering information on the status of the conductors, and thus of the phase line.

Figure 20:
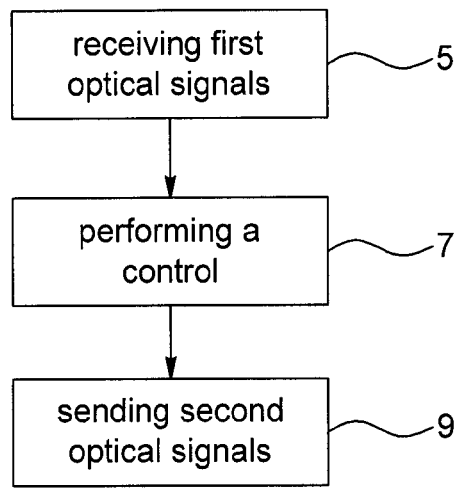
FIG. 20 is a block diagram showing steps of a method, according to an embodiment of the invention.

Referring to FIG. 20, the invention also concerns a method for varying the impedance of a phase line of a segment of an electrical power line. The phase line includes n conductors electrically insulated from each other and short-circuited together at two ends of the segment. The method includes the steps 5, 7 and 9, of:
  a) receiving first optical signals on a switching apparatus associated with the segment, the switching apparatus including a controllable switching device connected with at least one of the conductors;
  b) performing a control of the switching device based on the first optical signals; and
  c) sending second optical signals from the switching apparatus to adjacent switching apparatuses, the second optical signals including status information of the one switching apparatus, upon which a control of adjacent switching apparatuses is based.

According to this method, which occurs in a switching apparatus first optical signals are received on the optical port of the switching apparatus. These first optical signals include instructions for controlling the switching device of the switching apparatus. The optical signals can be transmitted by the remote control system, or from adjacent switching apparatuses. The apparatus can in turn send second optical signals to adjacent switching apparatuses, including status information of the switching apparatus. Adjacent switching apparatuses can thus also control their respective switching devices based on these second optical signals.

Figure 21:
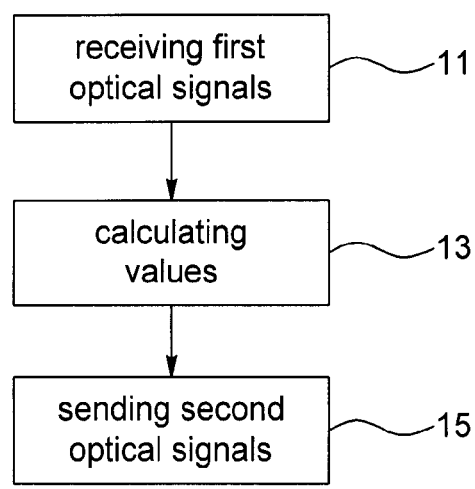
FIG. 21 is a block diagram showing steps of another method, according to an embodiment of the invention.

Referring to FIG. 21, the invention also concerns a method for varying impedance an electrical power line. The method includes the steps 11, 13, 15 of:
  a) receiving first optical signals on switching apparatuses associated with the segments, each switching apparatus including a controllable switching device connected with at least one of the conductors;
  b) calculating values based on the first optical signals on one of the switching apparatus; and
  c) sending second optical signals from the one switching apparatus to adjacent switching apparatuses, the second optical signals including the values of step b), upon which a control of adjacent switching apparatuses is based.

This method allows distributing computations related to parameters of the electrical network amongst the controllers of the switching apparatuses of an electrical line. In this case, a controller receives first optical signals from adjacent switching apparatuses and calculates values based on the first optical signals received. The first optical signals can include, for example, status information of the adjacent switching apparatuses. The computed values would then be based on the status information of the adjacent switching apparatuses, and be related to parameters of the electrical network, such as phasor calculations for example. The controller can then send second optical signals, via its optical port, including the values calculated. The values can be sent back to the remote control system, or to adjacent switching apparatuses, in order for a control of the switching device to occur, only if it is needed. Of course, the first optical signals can also include other information, from the remote control system for example, or from other switching apparatuses which are not necessarily adjacent to the switching apparatus. The optical signals may also include information from other electrical power lines of the network, allowing to truly distribute computations amongst the switching apparatuses of the network.

In summary, a smart transmission system consists of a set of smart conventional transmission-lines composed of onboard changeover switches on the phases of the line segments for which we optically connect the control or computation processors of the switching modules of the three phases A, B and C between themselves with those located along the transmission-line and with the control center of the transmission system with the aid of an optical link. This smart transmission system allows for the distribution of control and protection functions of the system along the transmission-lines, the increase of computing power in the transmission system, the reduction in communication time, the simple increase of redundancy in the computing and control processors, the increase of redundancy in the measurement systems, the increase of redundancy in the communication systems, the increase of robustness in the system from electromagnetic disturbances, the increase of robustness in the system from undesired intrusions, the simple increase of redundancy in the GPS, the increase of robustness in the system from disturbances to GPS, the simple increase of redundancy in the transceivers to communicate with the sensors located along the line segment by utilizing the appropriate software.

For corridors of transmission-lines with more than one line per corridor (ex: two or three lines) we can optically connect the other switching modules by optically connecting the routers located on anchor towers of the second or third line in the immediate environment of the same mini substation with those from the main line with the fibre optic ground wire or others. If the other lines in the same corridor possess their own fibre optic ground wire then the optic link between the routers of the same mini substation increases the redundancy in the communication system.

As it can be appreciated, the present invention allows for the resolution of at least some of the drawbacks explained previously, by obtaining a distributed transmission system where the control and basic computations necessary for system control can be executed at the level of the switching modules distributed on the phases along the line and the results after a first processing with the appropriate software's are shared between the switching modules and the control room This reduces the quantity of information that needs to be shared and reduces the communication time all while having a fast, safe, and reliable response time. The control and computation distribution can be done because of the use of optical fibres, which are secure, reliable and less likely to be tampered, and because they have a larger bandwidth than the RF band.

Advantageously, the present invention enables to distribute the processing of information, which is needed to control an electrical system. It also allows distributing the protection of the transmission lines in the mini substations located along the transmission lines.

Another advantage of the invention is the increased redundancy and the computing power of the processing system and the control of the line and smart transmission system.

Yet another advantage is the increased robustness of the smart line and the smart system to electromagnetic disturbances and to potential disturbances of the GPS system.

Still another advantage is the robustness of the communication over the system.

With reference to FIGS. 7, 9, 16, 17 and 18, a preferred embodiment of the system includes clustered line segments (ex: line 735 kV with segments of 30 km) with isolated sub-conductors between them, switching modules on each phase, one or more control processors with optical couplers in each switching apparatus of a chain of isolators with fibre optics on each of the phases A, B, and C, to share the backup control processor and the additional processors. The addition of a router enables the coordination of communication between the processors of the switching modules of the phases A, B, C with the other routers of the other mini substations of the same line across the fibre optic ground wire. The router can also coordinate the communication with other routers of the other lines of the same corridor and the same substations.

The control and computing processors of the switching modules communicate with the other control and computing processors of the other switching modules with the aid of fibre optics. These control processors communicates with the aid of an input output bus with the sub-systems of the switching module such as the mechanical changeover switches and/or the electronic changeover switches, the linear motors, the sensors for tension, current, position, the GPS, the inductive and capacitive power supplies, the P.L.C, emitter-receiver, etc. This input output bus can be either optic or galvanic, as shown in FIG. 16.

The power supply of the router can be done with the aid of a solar panel and/or a capacitive power supply.

A preferred way to connect two switching modules back to back is shown in FIGS. 7 and 9. The redundancy of the power supplies of the switching modules mounted back to back by electronically connecting them because they have the same potential.

In the switching module, the three task processing processors in parallel with a fourth standby backup processor and the additional processors in order to complete specific tasks can be or can not be mounted on the same chip. Further, they can be connected between themselves by galvanic or optical connections.

The invention enables the distribution of information processing needed to control the system and the protection of the transmission-lines in mini substations located along the transmission-lines. This new technology connects each switching modules with at least one fibre optic, one coming from a router and the other from the second switching module located on the back of the first module instead of a simple RF connection. This optical link can be a large band>10 GHz and with multi-channels (different wave lengths). This redundant optical link enables the regrouping of the processors of the two switching modules of each phase back to back and the three phases A, B and C of the same substation between them with the aid of a router. The routers from mini substations of a same line are connected between themselves and with the control center of the system with the aid of fibre optics. This increases:

1. The redundancy and the computing power of the processing system and the control of the line and smart transmission system. Preferably, each switching modules includes three processors that carry out the processing of the task in parallel with a pending fourth processor to take over in the case of malfunction. A certain number of processors can be added to carry out additional tasks. All these processors grouped with those of other phases with different potentials act like a super processor and the back-up processors and the additional processors can be shared.
2. The redundancy and the computing power of the processing system and the control of the line and smart transmission system. By optically connecting the processors, the back-up processors, and the additional processors of lines located in the same corridor at different potentials and in the same mini substations.
3. The robustness of the smart line and the smart system to electromagnetic disturbances (ex: solar storms, electromagnetic pulses and electromagnetic noise). Only the signal sensors located along the 30 km segment are connected by an RF communication link to the corresponding switching module. These signals are not critical to the operation and protection of the transmission system.
4. Easily the redundancy at the GPS level, of the Power Line Carrier P.L.C and of the transceivers for communicating with the sensors located along the segment associated with the switching modules.
5. The robustness of the transmission system to potential disturbances to the system (GPS). Because a temporal reference signal is sent to each switching module by fibre optic with an indicator of the path taken. This time reference is calibrated with the aid of GPS for different paths.
6. The robustness of the transmission system to undesired intrusions by utilizing appropriate communication protocols and encryption in a relatively secure environment of an isolated fibre optic system.
7. The robustness of the communication by increasing the redundancy in the channels and the communication fibres.

The architecture of the smart transmission system enables the measurement of redundant synchrophasors distributed along the lines, the protection of the lines, the control of the network with a control of the compensation and the power flow, a control of stability, an increase in the transit capacity, the management in real time of the system, the de-icing of lines, the surveillance in real time of the lines and switching modules, the planning of maintenance in function of the needs and the establishment of databases of the transmission system for future use. Such databases can of course be located remotely.

The surveillance of the lines implies a surveillance of electrical events (ex: flashover caused by static over-voltage), mechanical events (ex: galloping, wind vibrations), meteorological events (ex: ice, lightning).

Further, this architecture enables the view in real time of the power flow in the system, the creation of databases of events experienced by the line and the electric network and the deduction of a series of actions to execute in real time or in delayed time in order to ensure the use and optimal maintenance of the transmission system. This highly redundant technology enables the obtaining of a reliable and safe smart transmission system.

Each switching module preferably includes mechanical changeover switches and/or electronic changeover switches, actuators or linear motors, sensors for current, tension, and position, and a transceiver to communicate with the sensors located along the segment associated with this switching module.

The redundancy in the power supplies of the switching apparatuses can be increased by electronically connecting between them two modules mounted back to back on the same phase in a manner where they share the power supply.

Another advantage of the present invention is that with the data obtained from all the switching apparatuses of the electrical power network, and from the control of these apparatuses, the behaviour and reliability of the network can be increased, using appropriate software applications and expert systems. The scope of the claims should not be limited by the preferred embodiments set forth in the examples, but should be given the broadest interpretation consistent with the description as a whole.

The invention claimed is:
1. A system comprising
first and second switching apparatuses and a router;
a phase line including conductors electrically insulated from each other;
said first and second apparatuses being for varying impedance of the phase line or different phase lines of segments of a first electrical power line, the conductors being short-circuited together at two ends of a segment;
each of the first and second apparatuses comprising:
at least one controllable switching device for connection with at least one of the conductors; and
a controller at the potential of said one conductor of the phase line, for performing control of the at least one controllable switching device, the controller having at least first and second optical ports for receiving first optical signals on which said control is based, and for sending second optical signals, said second optical signals including status information of the first or second switching apparatus, the status information including at least whether the controllable switching device is open or closed;
wherein the first optical port of the first apparatus is connected to the first optical port of the second apparatus via a first optical fiber;
the second optical port of the first apparatus is connected to the router via a second optical fiber; and the second optical port of the second apparatus is connected to the router via a third optical fiber.

2. A system comprising three systems, each of the systems being as in claim 1 and being a back-to-back system, said first electrical power line having three phase lines, the three back-to-back systems being respectively associated with said three phase lines, wherein, for each back-to-back system:
the first optical port of the first apparatus is connected to the first optical port of the second apparatus via said first optical fiber; and
the second optical ports of the first and second apparatuses are connected to the router via second and third optical fibers,
whereby the controllers of said switching apparatuses send and receive said first and second optical signals via the router.

3. The system according to claim 2, further comprising at least one optical fiber for connecting said router to a main optical fiber running along said first and second segments.

4. The system according to claim 3, in combination with said main optical fiber which is connected to a remote control system.

5. A distributed system for varying an impedance of different segments of said first electrical power line, the distributed system comprising several systems, as claimed in claim 2, where said first and second segments associated with said several systems form said different segments, wherein:
the routers are connected in series with router-to-router optical fibers.

6. The system according to claim 4, wherein at least one of the routers is further connected to second adjacent routers via two other router-to-router optical fibers, respectively.

7. A bridged system comprising first and second switching apparatuses, each apparatus being as claimed in claim 1, the first and second switching apparatuses being for varying the impedance of segments located on independent, parallel and adjacent electrical power lines, each of the segments including three phase lines, the system further comprising:
first and second routers connected respectively with the first and second switching apparatuses via optical fibers; and
another optical fiber for connecting together said first and second routers.

8. A bridged system comprising two systems, each as claimed in claim 2, the two systems being for varying the impedance of two electrical power lines that are independent, parallel and adjacent, the bridged system further comprising:
a router-to-router optical fiber for connecting together two adjacent routers of said two systems;
a main optical fiber provided along a length of one of the segments; and
at least one optical fiber for connecting one of the routers to the main optical fiber.

9. The system according to claim 1, wherein the router comprises a power source for supplying power to the router, said power source being a solar-based power source or a capacitive coupling device.

10. The system according to claim 2, wherein the router comprises a wavelength-division multiplexer, for multiplexing said second optical signals received from said three switching apparatuses on said other optical fiber.

11. The system according to claim 1, wherein for each switching apparatus, the controllable switching device includes at least one of: a mechanical switch, an electromechanical switch, a vacuum interrupter and an electronic switch.

12. The system according to claim 1, wherein each switching apparatus further comprises at least one detector selected in the group comprising a current detector, a voltage detector, a position detector and a stress gauge, said at least one detector being connected to the controller.

13. The switching apparatus system according to claim 1, wherein for each switching apparatus, the controller comprises three processors operating in parallel and connected to one another, each processor including:
means for comparing three values of a given parameter, each value computed by one of the processors;
means for discarding one of said values when said one value is incoherent with the remaining two values.

14. The system according to claim 1, wherein for each switch apparatus, the controller further comprises a stand-by processor, said stand-by processor being linked to each of the three processors and being activated when one of said three values is discarded, in replacement of the processor which has computed said one value.

15. The system according to claim 1, wherein for each switching apparatus, the controller further comprises an additional processor, for performing specific computations of parameters of the electrical power line.

16. The system according to claim 1, wherein said first and second switching apparatuses each comprises a powering module, said powering modules being connected together with an electrical wire.

17. A system for varying an impedance of an electrical power line, the electrical power line having several segments connected in series, each segment having at least one phase line, each phase line having a potential and including n conductors electrically insulated from each other and short-circuited together at two ends of the segment, the system comprising several switching apparatuses, each apparatus being associated with one of the segments, each apparatus comprising:
a controllable switching device for connection with at least one of the conductors of said one segment;
a controller at the potential of one of said conductors of the phase line, for performing a control of the at least one controllable switching device, the controller having at least one optical port:
for receiving first optical signals from adjacent switching apparatuses connected to said segments which are adjacent to said one segment; and
for sending second optical signals to said adjacent switching apparatuses,
said controller being for calculating values representative of operational conditions of the electrical power line based on said first optical signals received, said second optical signals including said values, upon which a control of the controllable switching devices of adjacent switching apparatuses is based.

18. A method for varying an impedance of a phase line of a segment of a first electrical power line, the phase line having a potential and including n conductors electrically insulated from each other and short-circuited together at two ends of the segment, the first electrical power line including at least first and second switching apparatuses associated with the segment, the second switching apparatus being adjacent the first switching apparatus, the method comprising the steps of:
a) receiving first optical signals on a controller of the first switching apparatus associated with the segment, the first switching apparatus including a first controllable switching device connected with at least one of the conductors, the controller being at the potential of one of said conductors of the phase line;

b) performing a control of the first controllable switching device based on said first optical signals; and c) sending second optical signals from the first switching apparatus to said second adjacent switching apparatus, said second optical signals including status information of said first switching apparatus, upon which a control of the second adjacent switching apparatus is based, the status information including at least whether the controllable switching device is open or closed.

19. A method for varying an impedance an electrical power line, the electrical power line having several segments connected in series, each segment having at least one phase line, each phase line having a potential and including n conductors electrically insulated from each other and short-circuited together at two ends of the segment, the method comprising the steps of:

a) receiving first optical signals on controllers of switching apparatuses associated with the segments, each switching apparatus including a controllable switching device connected with at least one of the conductors, the controllers being at the potential of one of the at least one conductors of the phase line;

b) calculating values of the electrical power line based on said first optical signals on one of said switching apparatus; and c) sending second optical signals from said one switching apparatus to adjacent switching apparatuses, said second optical signals including said values, upon which a control of adjacent switching apparatuses is based.

20. The method according to claim 18, wherein:
in step a), said first optical signals include status information of said adjacent switching apparatuses, the status information including at least whether the controllable switching devices of said adjacent switching apparatuses are open or closed;

step b) further includes a sub-step i) of computing values of the electrical power line based on the status information received in step a); and in step c), said second optical signals further include the values computed in sub-step i), the method thereby allowing distributing computation amongst the switching apparatuses of the segments.

21. The method according to claim 20, wherein:
in step a), said first optical signals further include status information of other switching apparatuses of said phase line, and information from a remote control system.

22. The method according to claim 21, wherein:
in step a), said first optical signals further include status information of at least one other electrical power line.

23. The system according to claim 1, further comprising a third switching apparatus, said third switching apparatus comprising:

at least one controllable switching device for connection with at least one of the conductors; and a controller at the potential of said one of the conductors of the phase line, for performing a control of the at least one controllable switching device, the controller having at least first and second optical ports for receiving first optical signals on which said control is based, and for sending second optical signals, said second optical signals including status information of the first or second switching apparatus, the status information including at least whether the controllable switching device is open or closed;

wherein the first electrical power line has three phase lines;

wherein said first, second and third switching apparatuses are for varying the impedance of a single segment of said first electrical power line, each of said first, second and third switching apparatuses being respectively associated with one of said three phase lines;

wherein, for each of the first, second and third switching apparatuses, the controllers of the three switching apparatuses communicate with one another via the router.

* * * * *